(12) United States Patent
Misir et al.

(10) Patent No.: US 11,623,128 B2
(45) Date of Patent: Apr. 11, 2023

(54) TAP METHOD AND MOBILE APPLICATION FOR SPORTS DATA COLLECTION

(71) Applicant: TapStats, Inc., Staten Island, NY (US)

(72) Inventors: Paul Misir, Staten Island, NY (US); Eric Luke, Venice, CA (US)

(73) Assignee: TapStats, Inc., Staten Island, NY (US)

( * ) Notice: Subject to any disclaimer, the term of this patent is extended or adjusted under 35 U.S.C. 154(b) by 75 days.

(21) Appl. No.: 17/389,549

(22) Filed: Jul. 30, 2021

(65) Prior Publication Data

US 2022/0032161 A1     Feb. 3, 2022

Related U.S. Application Data

(60) Provisional application No. 63/059,362, filed on Jul. 31, 2020.

(51) Int. Cl.

| | |
|---|---|
| *G06F 3/0488* | (2022.01) |
| *A63B 71/06* | (2006.01) |
| *G06F 3/147* | (2006.01) |
| *G06F 3/04883* | (2022.01) |
| *H04L 67/131* | (2022.01) |
| *H04L 67/50* | (2022.01) |

(52) U.S. Cl.
CPC ...... *A63B 71/0622* (2013.01); *G06F 3/04883* (2013.01); *G06F 3/147* (2013.01); *H04L 67/131* (2022.05); *H04L 67/535* (2022.05)

(58) Field of Classification Search
None
See application file for complete search history.

(56) References Cited

U.S. PATENT DOCUMENTS

| | | | |
|---|---|---|---|
| 9,861,899 B1 | 1/2018 | Lawson et al. | |
| 10,220,290 B1 | 3/2019 | Podolosky et al. | |
| 10,537,807 B2* | 1/2020 | Farudi | A63B 71/0616 |
| 2004/0243261 A1* | 12/2004 | King | A63B 69/38 |
| | | | 700/91 |
| 2007/0004516 A1 | 1/2007 | Jordan et al. | |
| 2012/0129585 A1 | 5/2012 | Laycock et al. | |
| 2014/0089960 A1 | 3/2014 | Farah | |
| 2019/0099653 A1 | 4/2019 | Wanke et al. | |

\* cited by examiner

*Primary Examiner* — Tuan S Nguyen

(74) *Attorney, Agent, or Firm* — Dickinson Wright PLLC; Bryan Schomer

(57) ABSTRACT

A mobile application executable on a mobile device and system for sports data collection are provided. The system and mobile application carry out a method including the step of communicating with spectators to accept tap inputs each corresponding to a competition metric achieved by a selected competitor witnessed by the spectators while viewing at least one competition. The method continues by sending the tap inputs to a server controller in communication with the mobile device associated with a user interface. The method also includes the step of receiving and displaying tap data related to an analysis of the tap inputs for scoring purposes by the server controller and at least one comparison statistic associated with each the spectators from the server controller. The at least one comparison statistic associated with the tap inputs from each of the spectators compared to the tap inputs from others of the spectators.

20 Claims, 24 Drawing Sheets

NEW SOLUTION TO A NEW CHALLENGE:

KEEPING REALTIME PACE WITH A 24/7 DECENTRALIZED CRYPTO MARKET WITH NO STANDARDS, THAT TRADES VIRALLY, AND OUTRUNS LEGACY FINANCIAL RESEARCH METHODS.

NOTOS-X TIES FUNDAMENTALS TOGETHER WITH TRENDS AND PATTERNS AS THEY SURFACE. COMPLETE AND ACCURATE TO LEVELS NOT POSSIBLE BEFORE.

BEING A CENTRAL SOURCE OF INFORMATION DRIVES INSTITUTIONAL GROWTH:

MEANWHILE ON THE DEVELOPMENT SIDE, 'NETWORK EFFECTS' AND BLOCKCHAIN ENABLE NOTOS-X TO BECOME INCREASINGLY AUTONOMOUS, REALTIME AND ACCESSIBLE - A NEW STANDARD IN THE CASE OF 'RESEARCH'.

REPORTED DATA +
- LIVE / DELAYED PRICING FROM 90+ EXCHANGES

CROWD +
- DATA IS CONTINUOUSLY USER-RECONCILED, ALONG WITH CAPTURING KEY SOCIAL INSIGHT, TRENDS AND RED FLAGS
- FILLS KNOWLEDGE GAPS THAT OTHERWISE REMAIN
- COGNITIVE DIVERSITY CANCELS OUT MULTIPLE FORMS OF BIAS

= INFORMATIONAL ADVANTAGE
- DATA THAT IS MORE VIGOROUS, MORE RELIABLE, MORE BUYABLE
- X-LAYER PROPRIETARY DATA AROUND NOTARIZATION AND PROCESSING
- ALLOWS DATA LICENSING OPPORTUNITIES TO THE BEST INSTITUTIONS AND REFERENCE-ABLE CLIENTS
- 'GO TO' SOURCE FOR MEDIA QUOTING

*FIG. 25*

TAP METHOD AND MOBILE APPLICATION FOR SPORTS DATA COLLECTION

CROSS-REFERENCE TO RELATED APPLICATIONS

This utility application claims the benefit of U.S. Provisional Application No. 63/059,362 entitled "Tap Method and Application For Sports Data Collection" filed Jul. 31, 2020. The entire disclosure of the above application is incorporated herein by reference.

FIELD

The present disclosure relates to a system, a mobile application, and method for sports data collection during a sporting event.

BACKGROUND

This section provides a general summary of background information and the comments and examples provided in this section are not necessarily prior art to the present disclosure.

Viewership and viewer engagement of sporting events are important objectives of sports stakeholders such as, but not limited to advertisers and sponsors, governing organizations, athletes, cable television providers. Generally, sports fans watch the sporting events in-person or more frequently, on television or mobile devices. For example, many fans of MMA fighting typically view the fights as pay-per-view (PPV) events. Nevertheless, while such spectators are engaging in viewing the sporting event by watching on television or mobile devices, the engagement is primarily passive.

In addition, metrics related to athlete performance are frequently collected in various sports. For example in baseball and other sports, it may be possible to analyze player metrics to the point that teams may be able to decide player hiring and trading in order to exclusively hire undervalued players while trading or otherwise avoiding overvalued players. Such operations are known as "money ball". Data related to athlete performance is generally collected by observers such as judges, record keepers, or other panelists. Nevertheless, depending on the methods used to collect the data used to gauge athlete performance, the accuracy can vary significantly. This can be especially evident in fast-paced sports in which consequential actions may happen very quickly, such as, in fight sports like mixed martial arts (MMA) fighting. Even with multiple judges watching the fight with different vantage points, it is possible that some hits by one or both fighters may be missed. Furthermore, judges may even be biased, consciously or unconsciously, causing scoring and/or collection of metrics to become less accurate. Consequently, "money ball" does not exist in some sports today.

Accordingly, there is an increasing need for improved systems and methods for sports data collection that overcome these shortcomings.

SUMMARY

This section provides a general summary of the inventive concepts associated with the present disclosure and is not intended to represent a comprehensive disclosure of its full scope or all of its features, object, aspects and advantages.

An aspect of the present disclosure is to provide a server for sports data collection. The server includes a server communication unit for communicating with at least one user interface configured to interact with each of a plurality of spectators to accept a plurality of tap inputs. Each of the plurality of tap inputs correspond to a competition metric achieved by a selected competitor witnessed by each of the plurality of spectators while viewing at least one competition. The server also includes a server controller coupled to the server communication unit and configured to receive and record the plurality of tap inputs from each of the plurality of spectators during the at least one competition. The server controller is also configured to analyze the plurality of tap inputs to determine when a clear statistical event is evident from the plurality of tap inputs for scoring purposes. For each of the plurality of spectators, the server controller calculates at least one comparison statistic associated with the plurality of tap inputs from each of the plurality of spectators compared to the plurality of tap inputs from others of the plurality of spectators. The server controller is additionally configured to communicate the at least one comparison statistic to the at least one user interface associated with each of the plurality of spectators.

Another aspect of the present disclosure is to provide a mobile application including program instructions tangibly stored on a non-transitory computer-readable medium and operable when executed to cause a mobile device and perform a method of sports data collection via at least one user interface. The method of the mobile application includes the step of communicating with each of a plurality of spectators to accept a plurality of tap inputs each corresponding to a competition metric achieved by a selected competitor witnessed by each of a plurality of spectators while viewing at least one competition. The method continues by sending the plurality of tap inputs to a server controller in communication with the mobile device associated with the at least one user interface. The method also includes the step of receiving and displaying tap data related to an analysis of the plurality of tap inputs for scoring purposes by the server controller and at least one comparison statistic associated with each of the plurality of spectators from the server controller. The at least one comparison statistic associated with the plurality of tap inputs from each of the plurality of spectators compared to the plurality of tap inputs from others of the plurality of spectators.

Yet another aspect of the present disclosure is to provide a method of collecting sports data. The method includes the step of communicating with at least one user interface configured to interact with each of a plurality of spectators to accept a plurality of tap inputs each corresponding to a competition metric achieved by a selected competitor witnessed by each of the plurality of spectators while viewing at least one competition. The method continues with the step of receiving and recording the plurality of tap inputs from each of the plurality of spectators during the at least one competition. The next step of the method is analyzing the plurality of tap inputs to determine when a clear statistical event is evident from the plurality of tap inputs for scoring purposes. The method also includes the step of calculating at least one comparison statistic associated with the plurality of tap inputs from each of the plurality of spectators compared to the plurality of tap inputs from others of the plurality of spectators for each of the plurality of spectators. In addition, the method includes the step of communicating the at least one comparison statistic to the at least one user interface associated with each of the plurality of spectators.

The server, mobile application, and method disclosed herein can therefore provide improved sports data collection for event scoring and/or tracking athlete metrics. Specifically, highly statistical data related to athlete performance is collected from the plurality of spectators as the plurality of tap inputs and can therefore be more accurate and result in enhanced viewer engagement due to the viewing experience becoming more interactive.

Further areas of applicability will become apparent from the detailed written description provided herein. The description and specific examples provided in this summary section are intended for purposes of illustration only and are not intended to limit the scope of the present disclosure.

DRAWINGS

The drawings described herein are for illustrative purposes only of selected embodiments, and are not intended to limit the present disclosure to only that actually shown. With this in mind, various features and advantages of example embodiments of the present disclosure will become apparent from the written description when considered in combination with the appended Figures, wherein:

FIG. 25 shows a diagram illustrating how the reported data and crowd data can result in an informational advantage according to aspects of the disclosure.

DETAILED DESCRIPTION

In the following description, details are set forth to provide an understanding of the present disclosure. In some instances, certain circuits, structures and techniques have not been described or shown in detail in order not to obscure the disclosure.

In general, example embodiments of a server and mobile application associated with a sports data collection system and method constructed in accordance with the teachings of the present disclosure will now be disclosed. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are described in detail.

Figure 1:
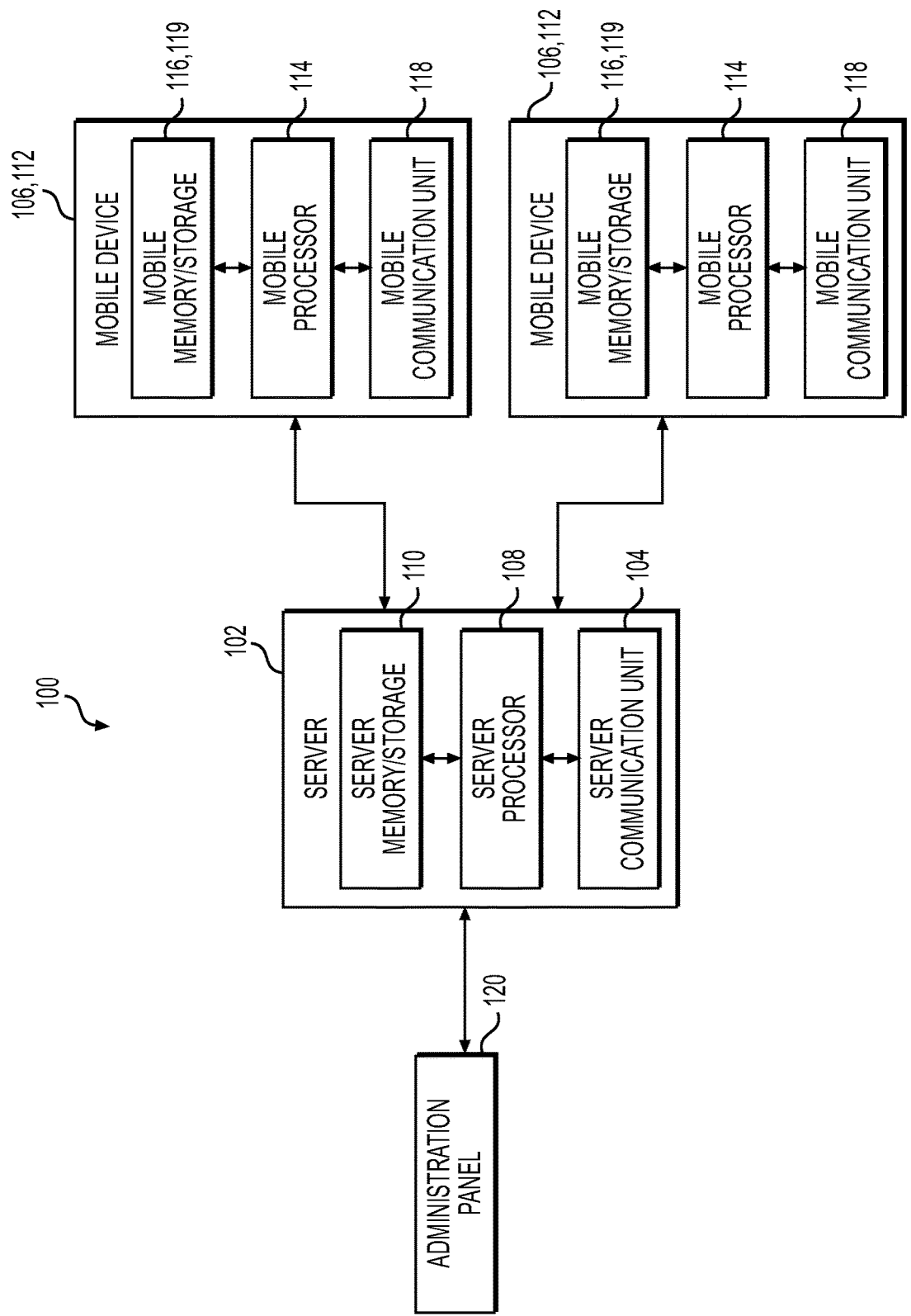
FIG. 1 is a block diagram of a system for sports data collection according to aspects of the disclosure.

Referring to the Figures, wherein like numerals indicate corresponding parts throughout the several views, a server 102 of a system 100, mobile application 119 executed by at least one mobile device 112 of the system 100, and method for sports data collection in accordance with aspects of the disclosure are provided. As best shown in FIG. 1, the system 100 includes a server 102 with a server communication unit 104 for communicating with at least one user interface 106 configured to interact with each of a plurality of spectators to accept a plurality of tap inputs and other inputs associated with the at least one user interface 106 and/or mobile application 119. Each of the plurality of tap inputs correspond to a competition metric achieved by a selected competitor witnessed by each of the plurality of spectators while viewing at least one competition. The server 102 also includes a server controller 108 or processor coupled to the server communication unit 104 and configured to receive and record the plurality of tap inputs from each of the plurality of spectators during the at least one competition. The server controller 108 is also configured to analyze the plurality of tap inputs to determine when a clear statistical event is evident from the plurality of tap inputs for scoring purposes. For each of the plurality of spectators, the server controller 108 calculates at least one comparison statistic associated with the plurality of tap inputs from each of the plurality of spectators compared to the plurality of tap inputs from others of the plurality of spectators. In addition, the server controller 108 is configured to communicate the at least one comparison statistic to the at least one user interface 106 associated with each of the plurality of spectators. The server controller 108 is further configured to receive a selected competitor input corresponding to a selected competitor for which each of the plurality of spectators would like to record the competition metric in response to each of the plurality of spectators selecting the selected competitor in the at least one user interface 106. The server controller 108 also receives a secondary competitor input corresponding to a secondary aspect of the competition metric in response to each of the plurality of spectators selecting the secondary aspect in the at least one user interface 106. The server controller 108 is also configured to record a timestamp for each of the plurality of tap inputs corresponding to a time during the competition when each of the plurality of tap inputs is received. The server 102 also includes a server memory 110 for the instructions executed by the server controller 108 and to store all information received and used by the server controller 108 (e.g., as one or more databases).

The system 100 also includes a plurality of mobile devices 112 in communication with the server 102 (e.g., via wireless communication). Each mobile device 112 includes a mobile controller 114 or processor and mobile memory 116 and a mobile communication unit 118 coupled to the mobile controller 114. Specifically, the mobile communication unit 118 of each of the plurality of the mobile devices 112 is configured to communicate with the server communication unit 104 (e.g., communicate the plurality of tap inputs and other inputs associated with the at least one user interface 106 and/or mobile application 119). Similar to the server memory 110, the mobile memory 116 stores instructions executed by the mobile controller 114 (e.g., the mobile application 119, discussed in more detail below) and all information received and used by the mobile controller 114. Thus, the at least one user interface 106 may be provided by the plurality of mobile devices 112. The system 100 additionally includes an administration interface 120 or panel configured to communicate with the server 102 (e.g., wired or wirelessly via the server communication unit 104).

As described herein, each of the plurality of mobile devices 112 can include devices such as, but not limited to a personal computer, a PDA, a consumer electronic device, a media device, a smart phone, a cellular, mobile phone, or any combination thereof. Each mobile device 112 can also include a mobile display 121 (FIGS. 5-20) presenting the at least one user interface 106 for interacting with one of the plurality of spectators.

As used herein, the wireless communication technology can include various types and variants of wireless communication configurable to facilitate wireless communication, including associated protocols or enhancements thereto including, but not limited to, any combination or portion of, IEEE 802.15-based wireless communication, Code-division multiple access (CDMA), Global System for Mobile Communications (GSM), Bluetooth communication, WIFI® communication or IEEE 802.11-based communication (hereinafter referred to as "WIFI"), WiMAX or IEEE 802.16-based communication, various proprietary wireless communications, or any combination thereof.

Furthermore, devices or modules that are in communication with one another need not be in continuous communication with each other unless expressly specified otherwise. In addition, devices or modules that are in communication with one another may communicate directly or indirectly through one or more intermediaries. A communicative interaction may be intending to send information, sending information, requesting information, receiving information, receiving a request for information, or any combination thereof. As such, a communicative interaction could be unidirectional, bidirectional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. The communicative interaction between the network elements is not necessarily limited to only one specific form. A network element may be a node, a module, a piece of hardware, software, firmware, middleware, another component of a computing system, or any combination thereof.

Figure 2:
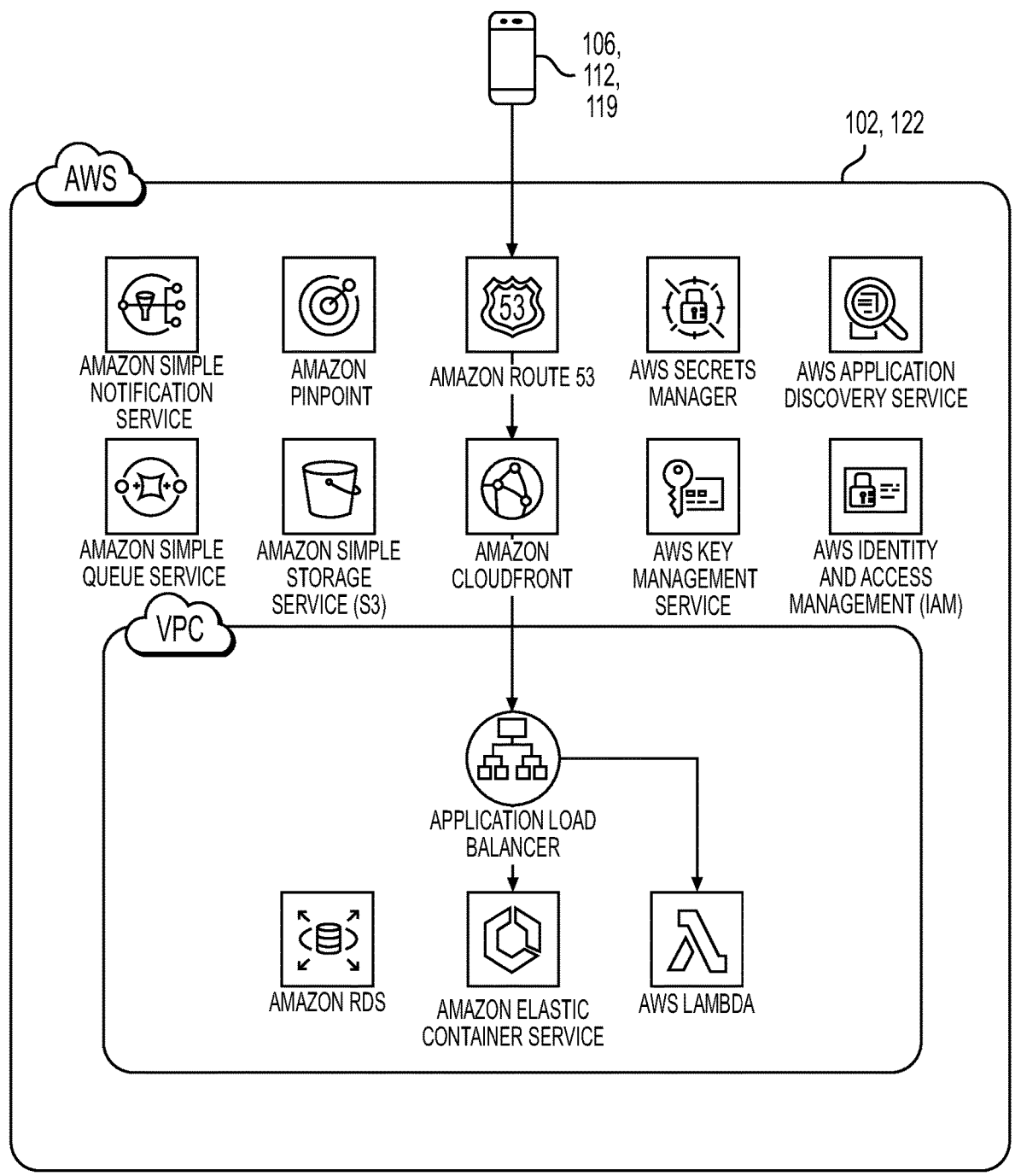
FIG. 2 shows a block diagram of a backend infrastructure associated with a server of the system of FIG. 1 according to aspects of the disclosure.

FIG. 2 shows a block diagram of a backend infrastructure 122 associated with the server 102 utilizing Amazon Web Services (AWS) according to aspects of the disclosure. Representational state transfer (REST) and Hasura application programming interfaces (API) for GraphQL are utilized. In addition websockets with GraphQL subscriptions for real-time updates are also employed. The mobile application 119 primarily communicates with the backend infrastructure 122 using a library called Apollo. The administration interface 120 or panel is a React web app.

According to an aspect, the at least one competition may be at least one fight and the selected competitor input can be a selected fighter input corresponding to a selected fighter selected by each of the plurality of spectators in the at least one user interface 106 for which each of the plurality of spectators would like to record strikes. The secondary competitor input can be a body region input corresponding to one of a plurality of selected body regions of a target fighter selected from the group consisting of a head and a body and legs of the target fighter by each of the plurality of spectators in the at least one user interface 106 for which each of the plurality of spectators would like to record strikes by the selected fighter. Each of the plurality of tap inputs corresponds to one of the strikes by the selected fighter to the selected body region of the target fighter witnessed by each of the plurality of spectators while viewing the at least one fight.

Figure 3:
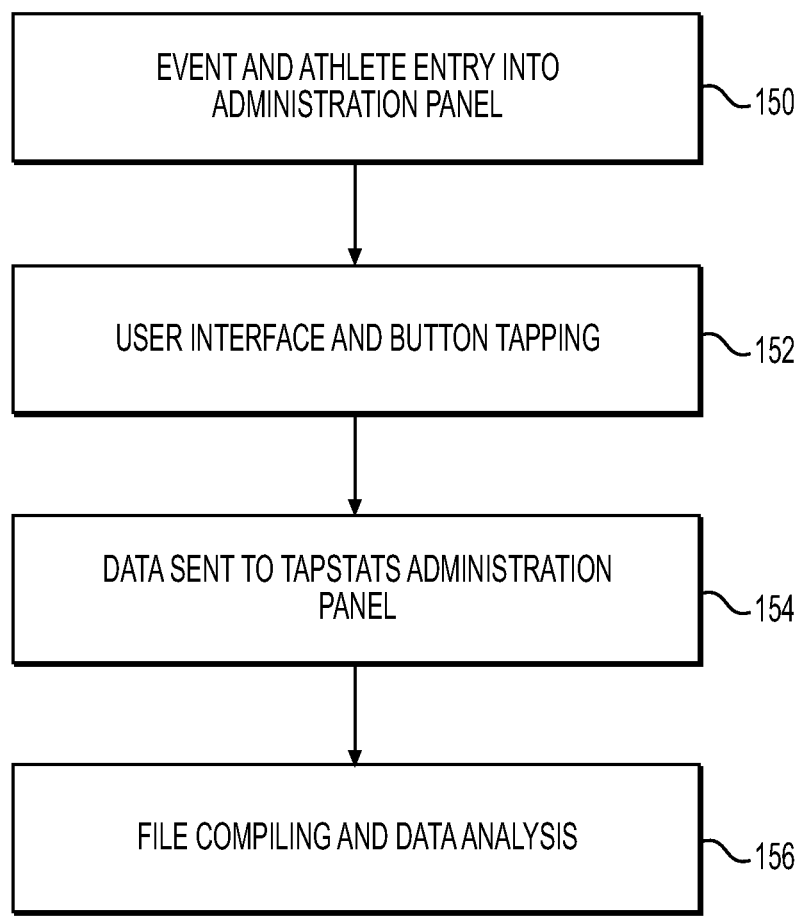
FIG. 3 shows an example sequence of the system of FIG. 1 in operation according to aspects of the disclosure.

As mentioned above and referring back to FIG. 1, the server communication unit 104 is further in communication with the administration interface 120. FIG. 3 shows an example sequence of the system 100 in operation. As indicated by the numeral 150, upcoming fight events are entered into the administration interface 120 or panel in advance. This includes all athletes and their standard fight statistics such as weight, weight class, reach, height, and win-loss-draw record. So, the administration interface 120 is configured to accept a plurality of fighter statistics inputs and a plurality of fighter characteristics inputs for each of the selected fighter and the target fighter for the at least one fight. Users or spectators can see upcoming fights and their associated fight cards in the mobile application 119 as soon as the data is entered into the administration interface 120. In other words, the server controller 108 is further configured to receive and communicate the plurality of fighter statistics inputs and the plurality of fighter characteristics inputs for each of the selected fighter and the target fighter for the at least one fight to the at least one user interface 106 using the server communication unit 104 for display to the each of the plurality of spectators. Nevertheless, it should be appreciated that such data may instead be scraped from websites using an artificial intelligence (AI) algorithm in order to automate fight events and athlete entry into the administration interface 120 and mobile application 119.

Still referring to FIG. 3, as indicated by the numeral 152, the user or spectator recognizes upcoming fight events in-app and, when the match starts, will be able to select a fighter to record strikes for (i.e., the selected fighter) in the mobile application 119 along with the respective part of the body their strikes hit: head, body, or legs. According to an aspect and as will be discussed in more detail below, the spectators record missed strikes, landed strikes, and significant strikes by holding down the main tap button for 1 millisecond, 100 milliseconds, or 200 milliseconds respectively, although these times may be adjustable. Taps can only be recorded once fight rounds have begun and before they have ended. Alternatively or additionally, the spectator can choose ahead of time what types of strikes they would like to record in the mobile application 119. While fights or matches can begin and end manually through the administration interface 120, it should be understood that use of an automated program to determine fight starts and ends is also contemplated.

As indicated by the numeral 154, data from all of the plurality of spectators is exported to the administration interface 120, which is accessible by administration team members. This includes timestamps of every tap, fight tapped for, fighter tapped for, and type of strike. Spectators are assigned a User ID, although account names may alternatively be used. As indicated by the numeral 156, data from the administration interface 120 and/or server 102 can be downloaded and/or analyzed (e.g., using an Excel spreadsheet). Statistics are run after major fights to determine the number of spectators who tapped and differences in latency between modes of watching fights. Tap data collection (of the plurality of tap inputs) begins at the user interface level. Throughout matches, the spectators tap at different time intervals in the mobile application 119 to record missed, landed, or significant strikes of fighters. Every tap input is recorded and logged into the administration panel under their unique User ID.

Figure 4:
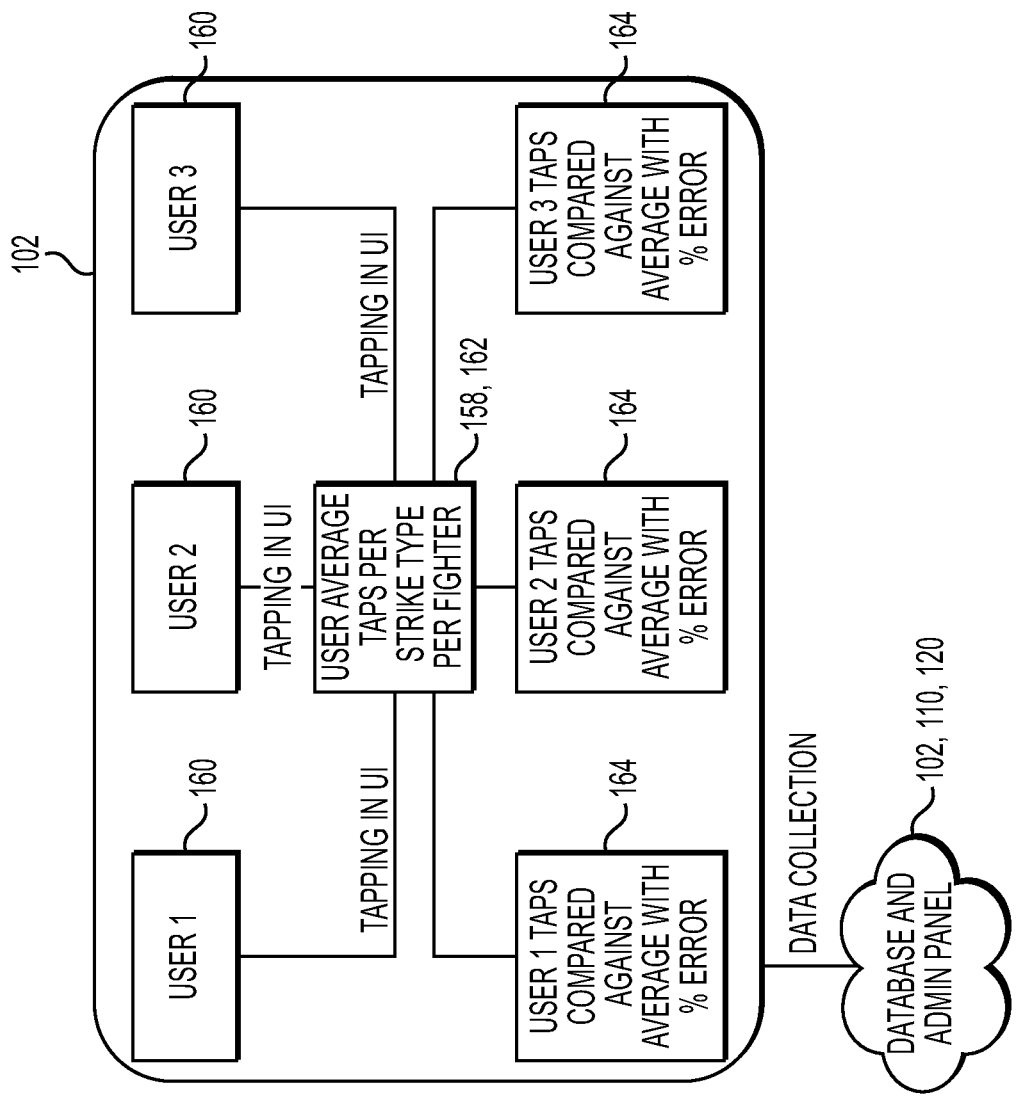
FIG. 4, shows an algorithm for analyzing the plurality of tap inputs according to aspects of the disclosure.
Figure 20:
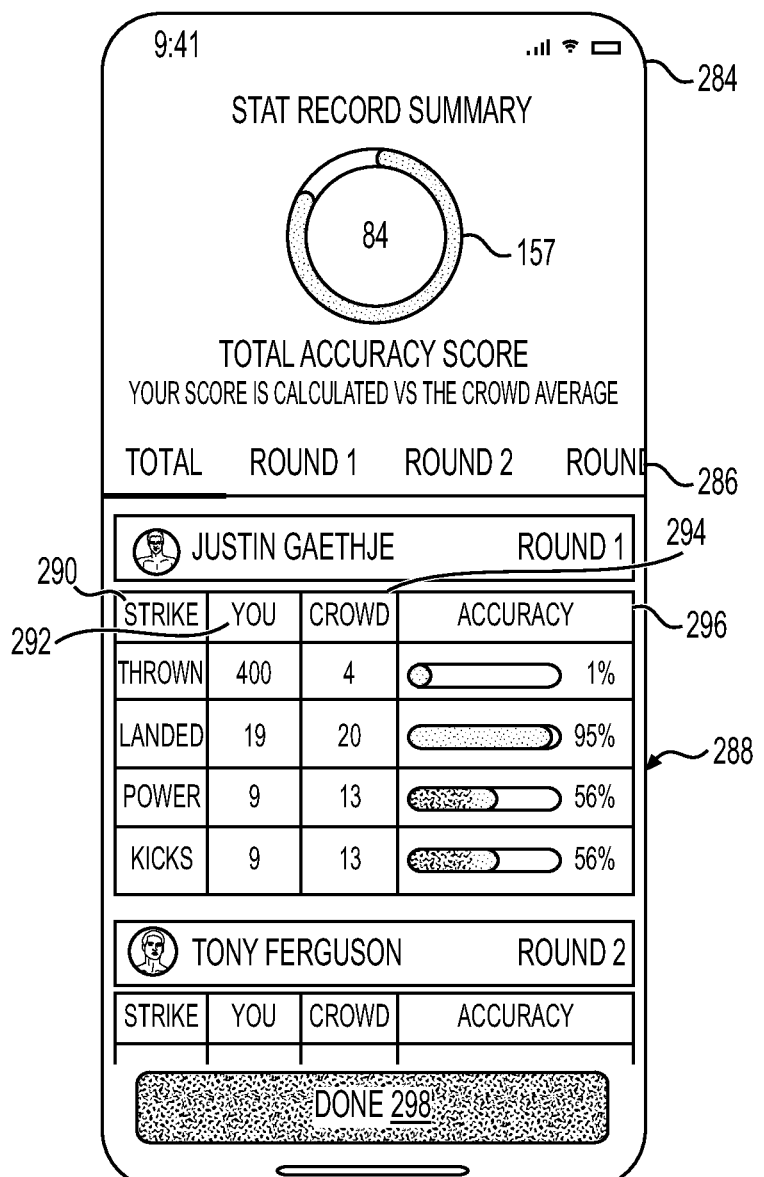
FIG. 20 shows a record summary screen of the mobile application of the mobile device of the system of FIG. 1 according to aspects of the disclosure.

According to another aspect and referring now to FIG. 4, showing an algorithm for analyzing the plurality of tap inputs, the at least one comparison statistic includes a spectator accuracy score 157 (FIG. 20). Thus, as indicated as numeral 158, the server controller 108 is further configured to determine a spectator average quantity of the plurality of tap inputs from each of the plurality of spectators (indicated as numeral 160 in FIG. 4) for one of the plurality of selected body regions and one of a plurality of strike types selected from the group consisting of attempted strikes, landed strikes, and power strikes. Also, as indicated as numeral 162, the server controller 108 is also configured to determine a crowd average quantity of the plurality of tap inputs from all of the plurality of spectators for all strike type combinations of each of the plurality of selected body regions and each of the plurality of strike types. So, the average number of taps (i.e., spectator average quantity of the plurality of tap inputs) throughout a round for each strike type combination is calculated. For example, averages are calculated for all of the plurality of spectators who tapped for head significant strikes, for body missed strikes, and so on. In addition, as indicated as numeral 164 in FIG. 4, the server controller 108 is configured to calculate the spectator accuracy score 157 for each of the plurality of spectators as a deviation of the spectator average quantity from the crowd average quantity for the one of the plurality of selected body regions and one of the plurality of strike types selected by each of the plurality of spectators. In other words, at the end of the match or fight, a post-fight or record summary screen (FIG. 20) displays the number of times the one of the plurality of spectators tapped compared to the average per round. The spectator accuracy score 157 is then issued using a percent error formula deviating from the average number. So, the server controller 108 communicates the spectator accuracy score 157 for the at least one fight to the at least one user interface 106 using the server communication unit 104 for display to each of the plurality of spectators.

It may be the case that one or more of the plurality of spectators consistently records inaccurate taps, thereby skewing the average upwards and decreasing every other one of the plurality of spectator's chance of 100% accuracy. To combat consistently inaccurate or "bad" taps, the system 100 and/or mobile application 119 can integrate a machine learning algorithm that would dispose of them in the average calculation. Thus, according to an aspect, the server controller 108 is further configured to identify ones of the plurality of tap inputs as a plurality of bad taps capable of skewing the crowd average quantity of the plurality of tap inputs. The server controller 108 is further configured to remove the plurality of bad taps from determining the crowd average quantity of the plurality of tap inputs while including the plurality of bad taps in determining the spectator average quantity of the plurality of tap inputs and calculating the spectator accuracy score 157 for ones of the plurality of spectators associated with the plurality of bad taps. This leaves the average unskewed, since any one of the plurality of spectators who is inclined to tap inaccurately has their taps invalidated by the algorithm. However, these bad or inaccurate taps would still contribute towards that spectator's spectator accuracy score 157.

In more detail and according to a further aspect, the server controller 108 is configured to calculate a first quartile and a third quartile of the plurality of tap inputs from all of the plurality of spectators. The server controller 108 calculates an interquartile range as the third quartile minus the first quartile. The server controller 108 is also configured to determine an upper bound as 1.5 multiplied by the interquartile range added to the third quartile and a lower bound as the first quartile minus 1.5 multiplied by the interquartile range. The server controller 108 additionally identifies ones of the plurality of tap inputs as ones of the plurality of bad taps being greater than the upper bound or less than the lower bound. In addition, the server controller 108 is configured to determine the crowd average quantity of the plurality of tap inputs using a conditional averaging function between the lower bound and the upper bound to exclude the plurality of bad taps from the crowd average quantity. While numerous functions are discussed above as being carried out by the server controller 108, it should be understood that such functionality may instead or additionally be carried out by other processors, such as, but not limited to the mobile controller 114. Similarly, functions or method steps will be discussed below as being carried out by as part of the mobile application 119 that are executed by the mobile controller 114 or processor. It should be appreciated that such functions or method steps may alternatively or additionally be carried out by the server controller 108, for example.

As mentioned above, the mobile application 119 is also provided (i.e., executed by the mobile controller 114 or processor of the mobile device 112). The mobile application 119 includes program instructions tangibly stored on a non-transitory computer-readable medium and operable when executed to cause the mobile device 112 and perform a method of sports data collection via the at least one user interface 106. So, the mobile application 119 may be a native application executed on the mobile device 112, which may operate using an operating system such as, but not limited to Android™, iOS™, and Windows® Phone. The mobile application 119 may be downloadable from an app store such as the iTunes™ App Store, Google Play Store™ or directly from a manufacturer web site, for example. The method of the mobile application 119 includes the step of communicating with each of a plurality of spectators to accept a plurality of tap inputs each corresponding to a competition metric achieved by a selected competitor witnessed by each of a plurality of spectators while viewing at least one competition. The method of the mobile application 119 also includes the step of sending the plurality of tap inputs to a server controller 108 in communication with the mobile device 112 associated with the at least one user interface 106. The of the mobile application 119 additionally includes the step of receiving and displaying tap data related to an analysis of the plurality of tap inputs for scoring purposes by the server controller 108 and at least one comparison statistic associated with each of the plurality of spectators from the server controller 108. The at least one comparison statistic associated with the plurality of tap inputs from each of the plurality of spectators is compared to the plurality of tap inputs from others of the plurality of spectators. The method of the mobile application 119 also includes the step of accepting a selected competitor input in the at least one user interface 106 corresponding to a selected competitor for which each of the plurality of spectators would like to record the competition metric. The method of the mobile application 119 continues by accepting a secondary competitor input in the at least one user interface 106 corresponding to a secondary aspect of the competition metric selected by each of the plurality of spectators.

Again, the at least one competition may be at least one fight and the selected competitor input is a selected fighter input corresponding to a selected fighter selected by each of the plurality of spectators in the at least one user interface 106 for which each of the plurality of spectators would like to record strikes. The secondary competitor input is a body region input corresponding to one of a plurality of selected body regions of a target fighter selected by each of the plurality of spectators in the at least one user interface 106 for which each of the plurality of spectators would like to record strikes by the selected fighter. Each of the plurality of tap inputs corresponding to one of the strikes by the selected fighter to the selected body region of the target fighter witnessed by each of the plurality of spectators while viewing at least one fight.

Figure 5:
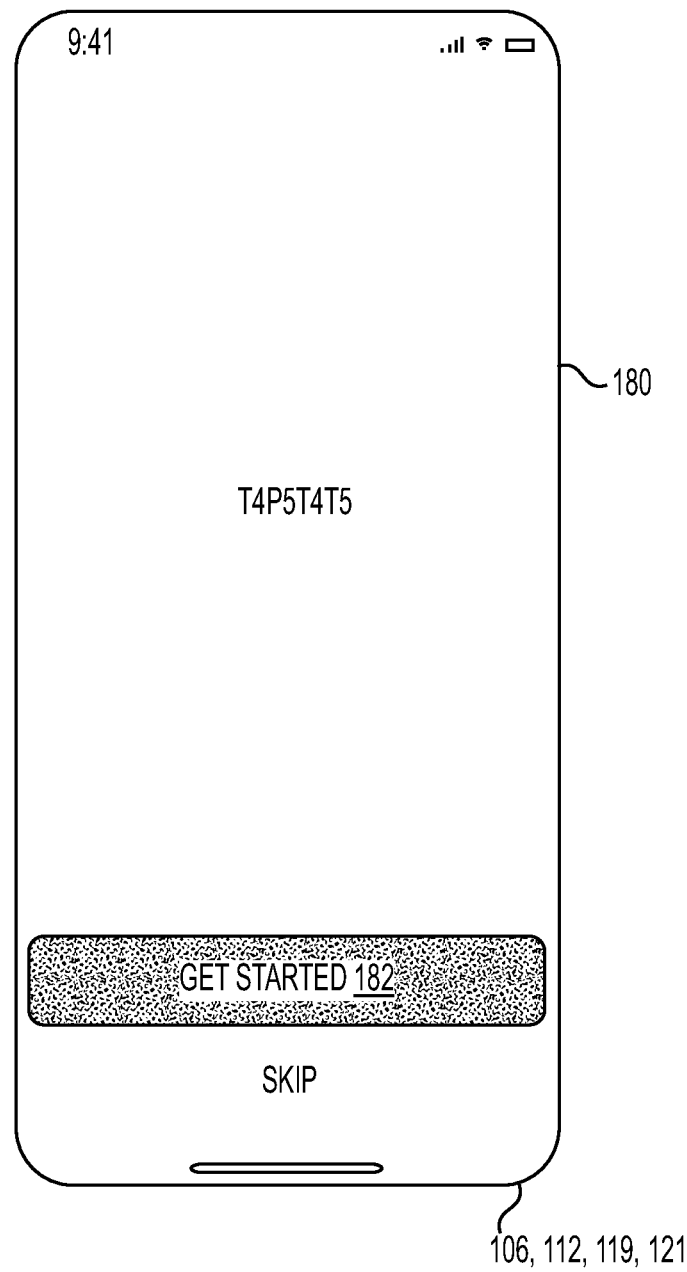
FIG. 5 shows an introductory screen of a mobile application of a mobile device of the system of FIG. 1 according to aspects of the disclosure.
Figure 6:
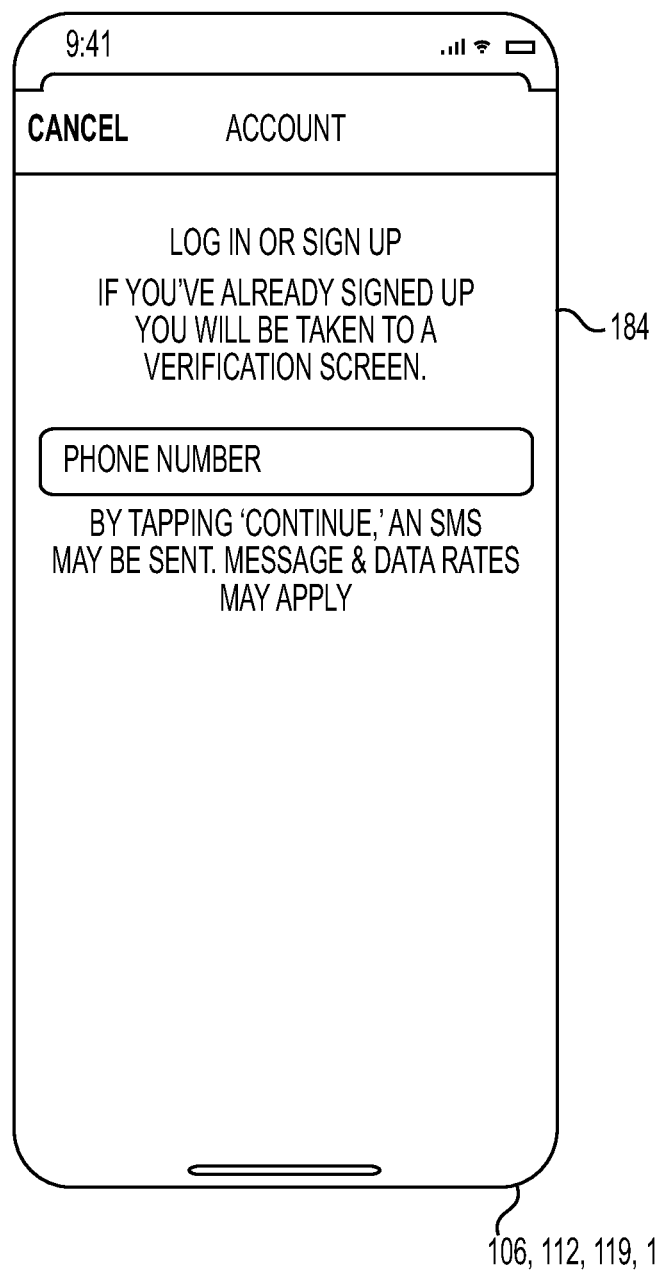
FIG. 6 shows a login and signup screen of the mobile application of the mobile device of the system of FIG. 1 according to aspects of the disclosure.

FIG. 5 shows an introductory screen 180 of the mobile application 119 on the mobile display 121 of the mobile device 112. A get started button 182 transitions each of the plurality of spectators to a login and signup screen 184 shown in FIG. 6. According to an aspect, each of the plurality of spectators may login using their phone number that is communicated to the server controller 108. Twilio can be used for phone number verification for each of the plurality of mobile devices 112. It should be appreciated that other user identification or user names and passwords may be utilized in addition or as an alternative to the phone number.

Figure 7:
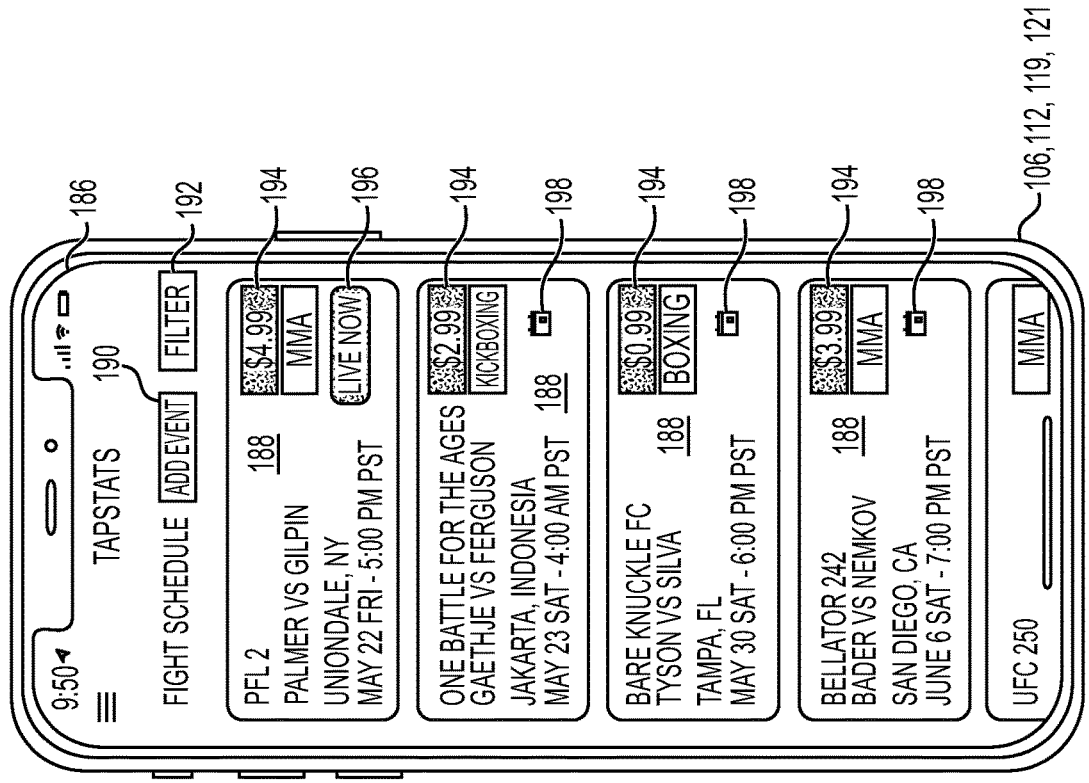
FIG. 7 shows a fight schedule screen of the mobile application of the mobile device of the system of FIG. 1 according to aspects of the disclosure.

FIG. 7 shows a fight schedule screen 186 of the mobile application 119. Each of the plurality of spectators can browse a fight schedule listing available at any given time. Events from all top professional and many amateur promotions are listed in one place. So, the method of the mobile application 119 also includes the step of receiving the fight schedule listing for at least one fight event 188 including the at least one fight from the server controller 108. Next, displaying the at least one fight event 188 on the fight schedule screen 186 of the at least one user interface 106 of one of the plurality of spectators. The fight schedule screen 186 includes an add event button 190 associated with an add event input for adding the at least one fight not listed on the fight schedule screen 186 and a filter button 192 for filtering the fight schedule listing of the at least one fight on the fight schedule screen 186 and for the at least one fight. Thus, the at least one spectator can filter by combat sport, promotion, and region. The fight schedule screen 186 includes a purchase fight button 194 associated with a purchase fight input for the one of the plurality of spectators to purchase the at least one fight event 188 and one of a live fight button 196 associated with a live fight input for viewing the at least one fight event 188 and a schedule fight button 198 for adding the at least one fight to the a calendar of the one of the plurality of spectators. So, the at least one spectator can add upcoming events to their calendar with alerts.

Figure 8:
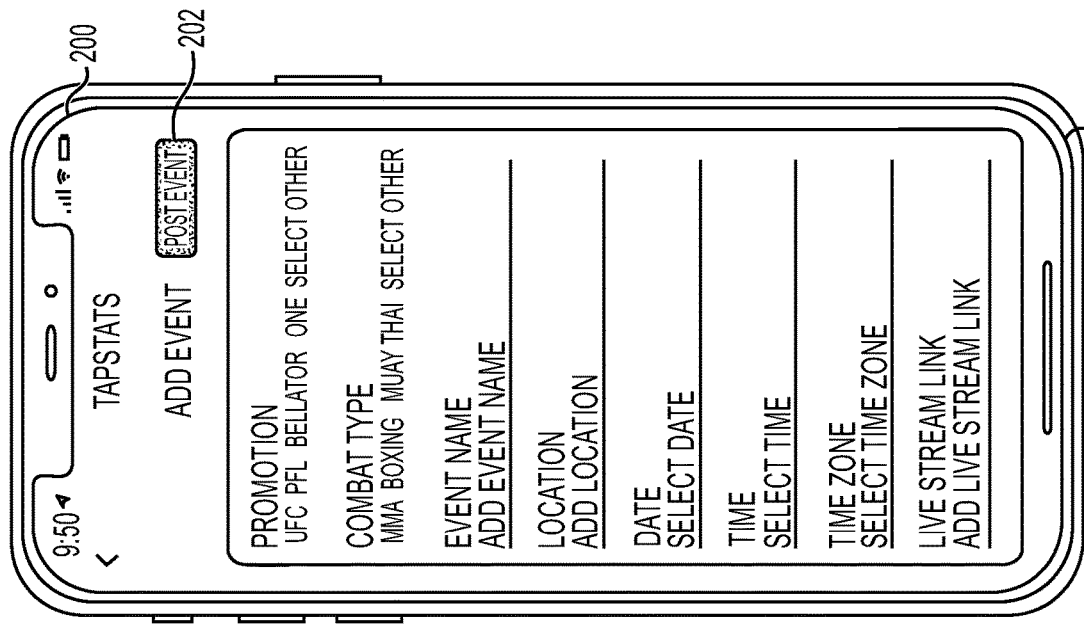
FIG. 8 shows an add event screen of the mobile application of the mobile device of the system of FIG. 1 according to aspects of the disclosure.

It is possible that the fight schedule screen 186 may not include all available fights or events. FIG. 8 shows an add event screen 200 of the mobile application 119. The method of the mobile application 119 includes the step of displaying the add event screen 200 in response to selecting the add event button 190. The method of the mobile application 119 continues by communicating the add event input and the purchase fight input and the live fight input to the server controller 108 based on the one of the plurality of spectators respectively selecting the add event button 190, the purchase fight button 194, and the live fight button 196. So, if there is a missing event, each of the plurality of spectators can add it to the schedule by entering necessary information and clicking a post event button 202 associated with a post event input. Consequently, the community ensures that even the smallest local fights are included by the system 100 and mobile application 119.

Figure 9:
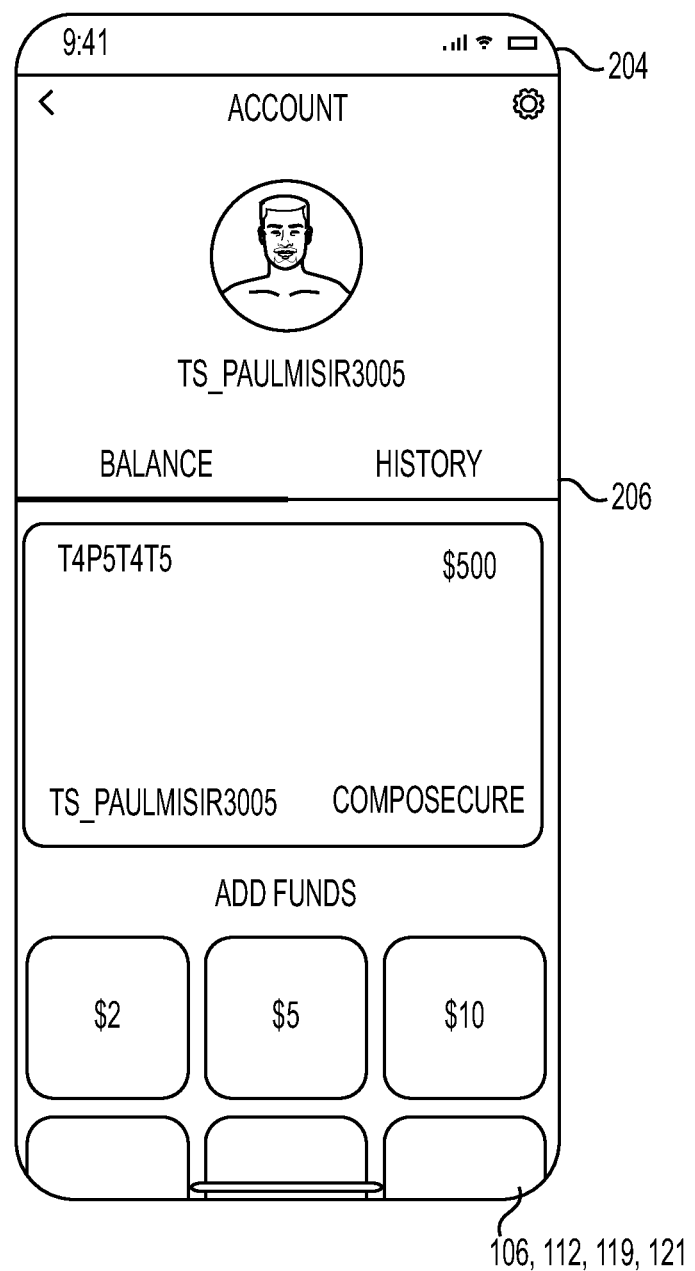
FIGS. 9 and 10 show an in-app balance screen of the mobile application of the mobile device of the system of FIG. 1 according to aspects of the disclosure.
Figure 10:
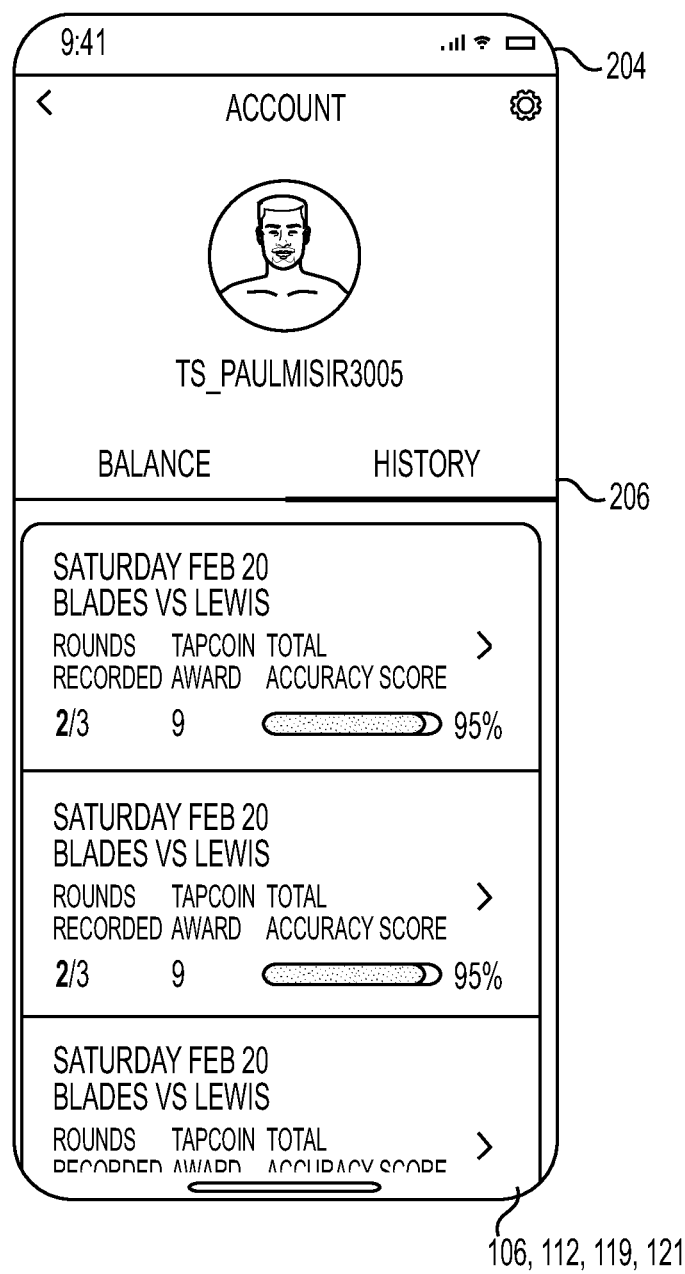

FIGS. 9 and 10 shows an in-app balance screen 204 of the mobile application 119. The in-app balance screen 204 allows each of the plurality of spectators to add funds to their account balance in order to make purchases in the mobile application 119, such as tipping the fighters, discussed in more detail below. A balance and history selector 206 associated with a balance and history input provides the ability of each of the plurality of spectators to show their account balance and add funds as shown in FIG. 9 or view their history as shown in FIG. 10.

Figure 11:
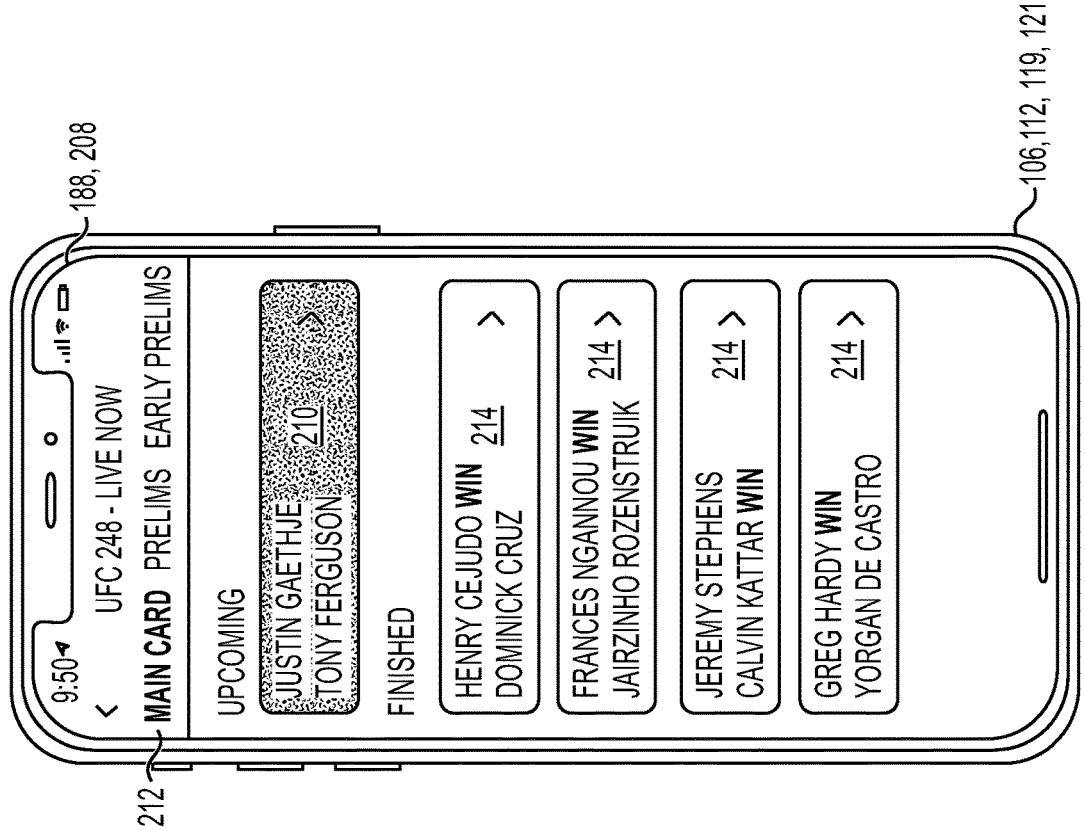
FIG. 11 shows at least one fight card screen of the mobile application of the mobile device of the system of FIG. 1 according to aspects of the disclosure.

FIG. 11 shows at least one fight card screen 208 of the mobile application 119. The method of the mobile application 119 also includes the step of receiving at least one fight card listing details of the at least one fight event 188 from the server controller 108 in response to the server controller 108 receiving the live fight input. Next, the method of the mobile application 119 includes displaying the at least one fight event 188 on the at least one fight card screen 208 of the at least one user interface 106 of one of the plurality of spectators. The at least one fight card screen 208 includes a select fight button 210 associated with a select fight input for selecting the at least one fight and a fight card selector 212 associated with a selected card input for selecting the at least one fight card. So, once a live event has been selected, each of the plurality of spectators can browse the card using the at least one fight card screen 208 to select from the upcoming fights to join the live action or finished fights 214 to view recorded stats.

Figure 12:
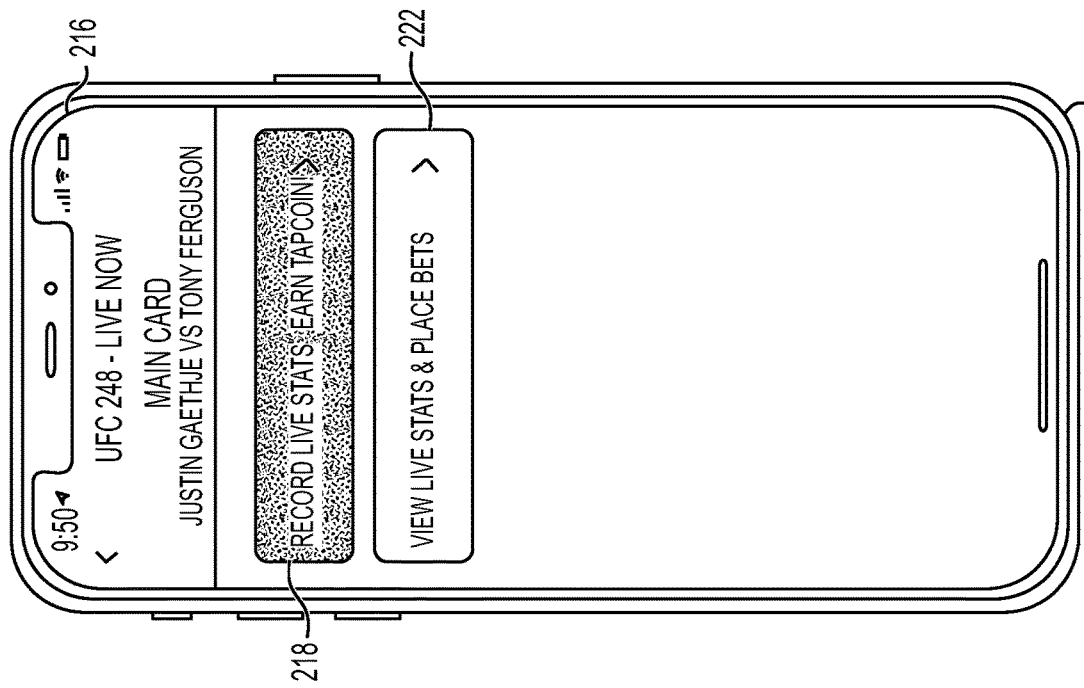
FIG. 12 shows a participation screen of the mobile application of the mobile device of the system of FIG. 1 according to aspects of the disclosure.

FIG. 12 shows a participation screen 216 of the mobile application 119. The method of the mobile application 119 also includes displaying the participation screen 216 in response to selecting the select fight button 210 of the fight schedule screen 186. The participation screen 216 includes a record live stats button 218 associated with a record live stats input for transitioning to a tap entry screen 220 allowing the one of the plurality of spectators to enter the plurality of tap inputs during the at least one fight. The participation screen 216 additionally includes and a view live stats and place bets button 222 associated with a view live stats and place bets input for transitioning to a view live stats screen 224 and wagering on the at least one fight. The method of the mobile application 119 proceeds with the step of communicating the select fight input and the selected card input and the record live stats input and the view live stats and place bets input to the server controller 108 based on the one of the plurality of spectators respectively selecting the select fight button 210, the fight card selector 212, the record live stats button 218, and the view live stats and place bets button 222. Thus, with the upcoming fight selected, each of the plurality of spectators can choose how to participate by recording live stats by "tapping" (tap anytime—once, or throughout the fight—as often as desired) while simultaneously earning digital currency (e.g., TapCoin) as each of the plurality of spectators plays. Alternatively, each of the plurality of spectators can also view live stats and place bets to wager the digital currency or money through betting partners.

The method of the mobile application 119 also includes the step of receiving a plurality of fighter statistics inputs and a plurality of fighter characteristics inputs for each of the selected fighter and the target fighter for the at least one fight from the server controller 108. In addition, the method of the mobile application 119 includes the step of displaying the plurality of fighter statistics inputs and the plurality of fighter characteristics inputs for each of the selected fighter and the target fighter for the at least one fight on the at least one user interface 106 for each of the plurality of spectators.

Figure 13:
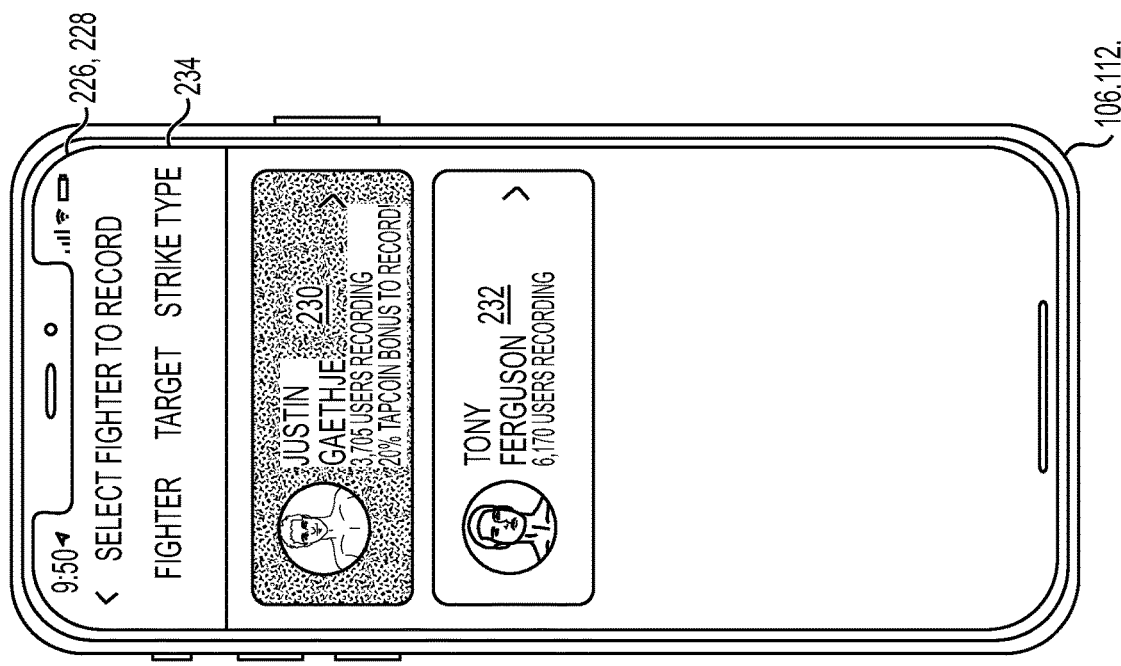
FIG. 13 shows a fighter selection screen of the mobile application of the mobile device of the system of FIG. 1 according to aspects of the disclosure.

FIG. 13 shows a fighter selection screen 226 of the mobile application 119. The method of the mobile application 119 also includes the step of receiving a fighter listing 228 for the at least one fight including the selected fighter and the target fighter from the server controller 108 in response to the server controller 108 receiving the select fight input. The method of the mobile application 119 continues with the step of displaying the fighter listing 228 on the fighter selection screen 226 of the at least one user interface 106 of one of the plurality of spectators including a selected fighter button 230 associated with the selected fighter input and a target fighter button 232 associated with a target fighter input for selecting the target fighter as the selected fighter in the at least one user interface 106 for which the one of the plurality of spectators would like to record strikes. The fighter selection screen 226 includes a fighter and target indicator 234 for indicating the selected fighter and the target fighter and one of a plurality of strike types selected by the one of the plurality of spectators. The method of mobile application 119 additionally includes the step of communicating the selected fighter input and the target fighter input to the server controller 108 based on the one of the plurality of spectators respectively selecting the selected fighter button 230, and the target fighter button 232. So, each of the plurality of spectators selects a fighter to record strikes for if they chose to record live stats. According to an aspect, selections that typically function better with more of the plurality of spectators participating may be rewarded with digital currency bonuses.

Figure 14:
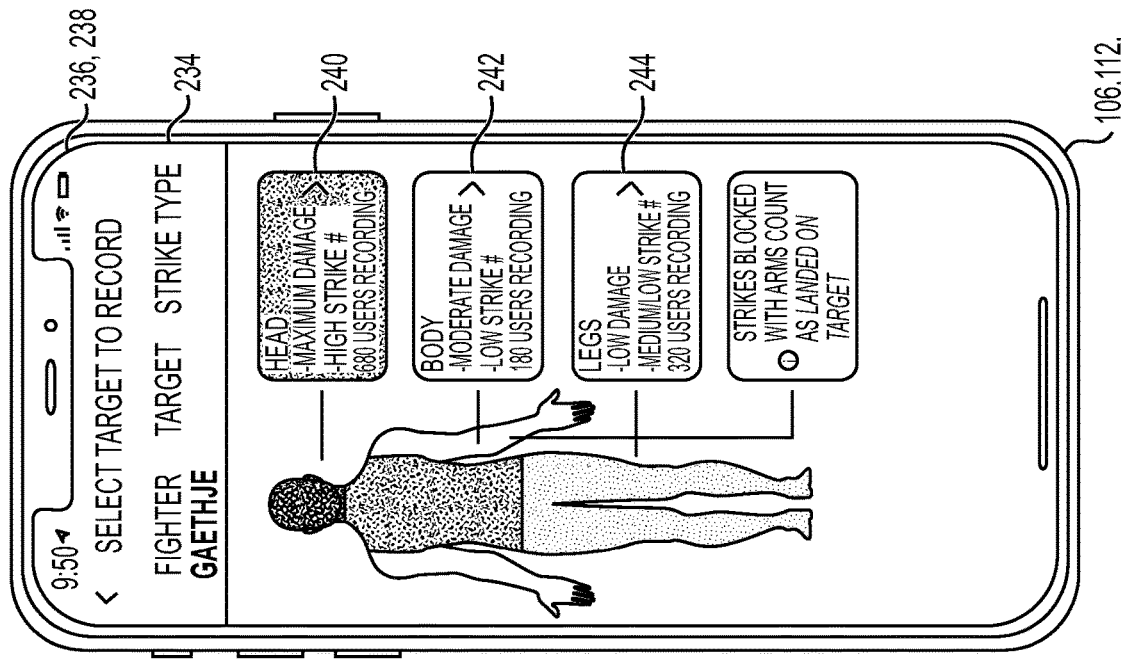
FIG. 14 shows a body region selection screen of the mobile application of the mobile device of the system of FIG. 1 according to aspects of the disclosure.

FIG. 14 shows a body region selection screen 236 of the mobile application 119. The next step of the method of the mobile application 119 is receiving a body region listing 238 for the plurality of selected body regions of the target fighter from the server controller 108 in response to the server controller 108 receiving the selected fighter input. The method of the mobile application 119 proceeds by displaying the body region listing 238 on the body region selection screen 236 of the at least one user interface 106 of one of the plurality of spectators in response to the one of the plurality of spectators selecting the selected fighter. The body region selection screen 236 additionally includes a head button 240 and a body button 242 and a legs button 244 associated with the body region input and the fighter and target indicator 234 for indicating the selected fighter and the target fighter and the one of the plurality of strike types selected by the one of the plurality of spectators. Additionally, the method of the mobile application 119 includes the step of communicating the body region input to the server controller 108 based on the one of the plurality of spectators selecting one of the head button 240 and the body button 242 and the legs button 244. Thus, each of the plurality of spectators selects a target or an area of the body to record strikes for. Having each of the plurality of spectators focus on a single target improves recording accuracy.

Figure 15:
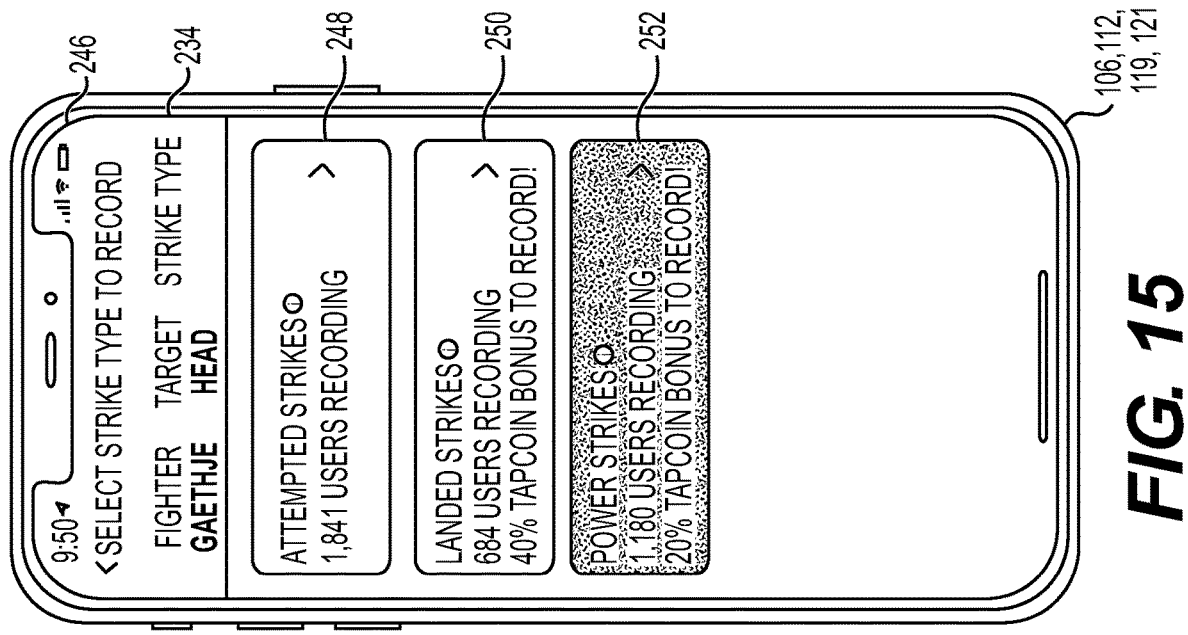
FIG. 15 shows a strike type selection screen of the mobile application of the mobile device of the system of FIG. 1 according to aspects of the disclosure.

Different strike types during the fight can be identified by each of the plurality of spectators. Each strike type has a different impact on damage and energy levels of the fighters. FIG. 15 shows a strike type selection screen 246 of the mobile application 119. The method of the mobile application 119 also includes the step of displaying the plurality of strike types on the strike type selection screen 246 of the at least one user interface 106 of one of the plurality of spectators. The strike type selection screen 246 includes an attempted strikes button 248 associated with an attempted strikes input and a landed strikes button 250 associated with a landed strikes input and a power strikes button 252 associated with a power strikes input for selecting the one of the plurality of strike types in the at least one user interface 106 which the one of the plurality of spectators would like to record as strikes. So, each of the plurality of spectators can choose from one of three different strike types to record. The strike type selection screen 246 also includes the fighter and target indicator 234 for indicating the selected fighter and the target fighter and the one of the plurality of strike types selected by the one of the plurality of spectators. The next step of method of the mobile application 119 is communicating the attempted strikes input and the landed strikes input and the power strikes input to the server controller 108 based on the one of the plurality of spectators respectively selecting the attempted strikes button 248, the landed strikes button 250, and the power strikes button 252.

Figure 16:
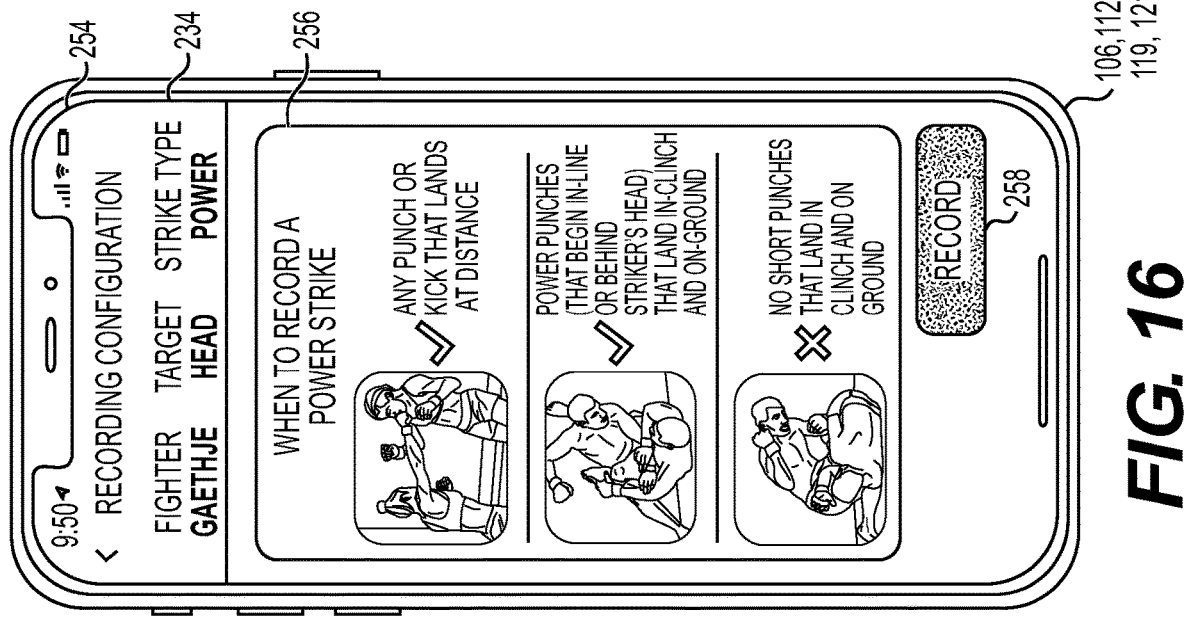
FIG. 16 shows a strike type information screen of the mobile application of the mobile device of the system of FIG. 1 according to aspects of the disclosure.

FIG. 16 shows a strike type information screen 254 of the mobile application 119. The method of the mobile application 119 also includes the step of displaying instructional information 256 for the plurality of strike types on the strike type information screen of the at least one user interface 106 of one of the plurality of spectators in response to the one of the plurality of spectators selecting the one of the plurality of strike types. Thus, each of the plurality of spectators can better understand the strike types and learn exactly how to judge each strike type to ensure the correct data is recorded. The strike type information screen 254 includes the fighter and target indicator 234 for indicating the selected fighter and the target fighter and a record button 258 associated with a record input and the one of the plurality of strike types selected by the one of the plurality of spectator. Next, communicating the record input based on the one of the plurality of spectators selecting the record button 258.

Figure 17:
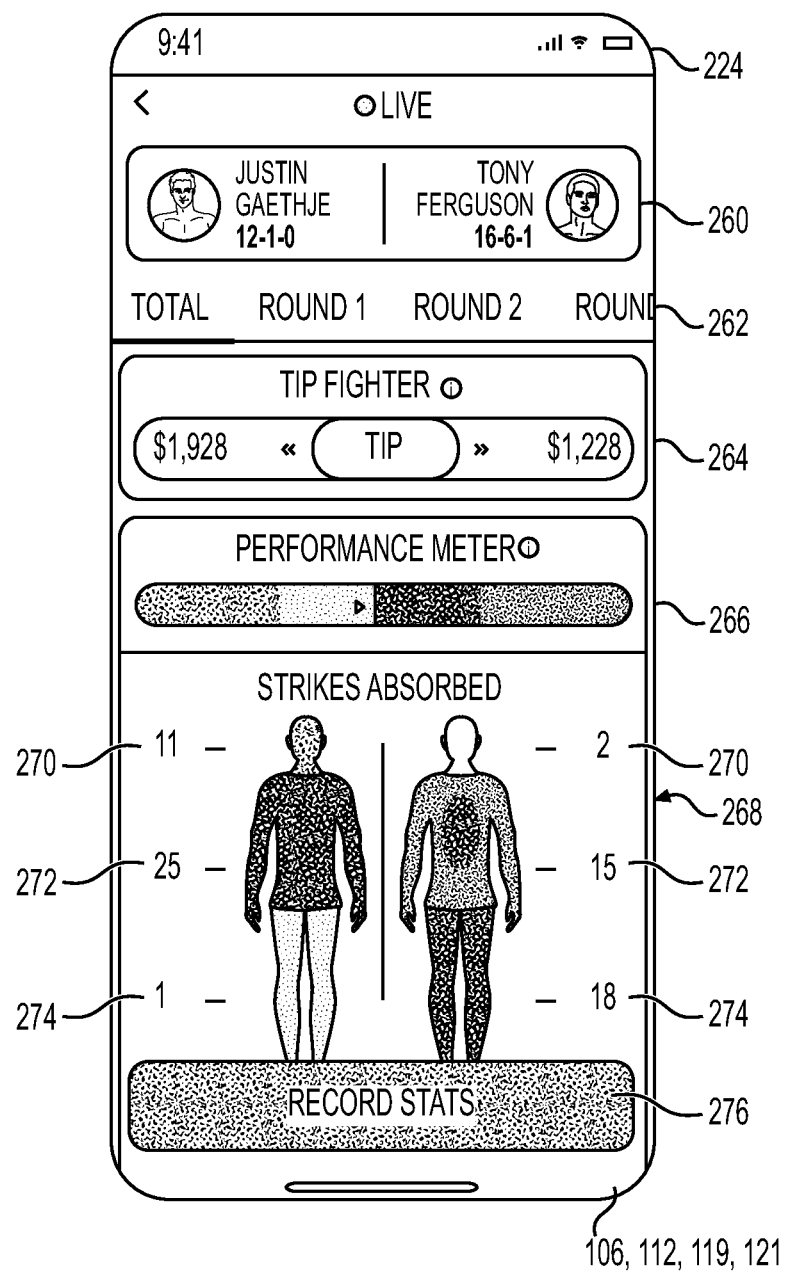
FIG. 17 shows a view live stats screen of the mobile application of the mobile device of the system of FIG. 1 according to aspects of the disclosure.

FIG. 17 shows the view live stats screen 224 of the mobile application 119. The method of the mobile application 119 additionally includes the step of displaying the selected fighter and the target fighter on the view live stats screen 224 of the at least one user interface 106 of one of the plurality of spectators in response to the one of the plurality of spectators selecting the record button 258. The view live stats screen 224 includes a selected fighter and target fighter indicator 260 illustrating the selected fighter and the target fighter. The view live stats screen 224 also includes a round selector 262 associated with a round input for selecting a round of the at least one fight. The view live stats screen 224 additionally includes a fighter tip selector 264 associated with a fighter tip input for tipping the selected fighter and the target fighter. In addition, the view live stats screen 224 includes a performance meter indicator 266 being a first graphical representation of a performance of the selected fighter and the target fighter on a line heat graph based on the plurality of tap inputs. The view live stats screen 224 also includes a strikes absorbed indicator 268 being a second graphical representation of the performance of the selected fighter and the target fighter on a body-shaped heat graph. The strikes absorbed indicator 268 includes an average power head strike counter 270 and an average power body strike counter 272 and an average power leg strike counter 274 for the selected fighter and the target fighter based on the plurality of tap inputs. The view live stats screen 224 additionally includes a record stats button 276 associated with a record stats input for the one of the plurality of spectators to start recording the plurality of tap inputs. So, the method of the mobile application 119 includes the step of communicating the fighter tip input and the round input and the record stats input to the server controller 108 based on the one of the plurality of spectators respectively selecting the fighter tip selector 264 and the round selector 262 and the record stats button 276.

Figure 18A:
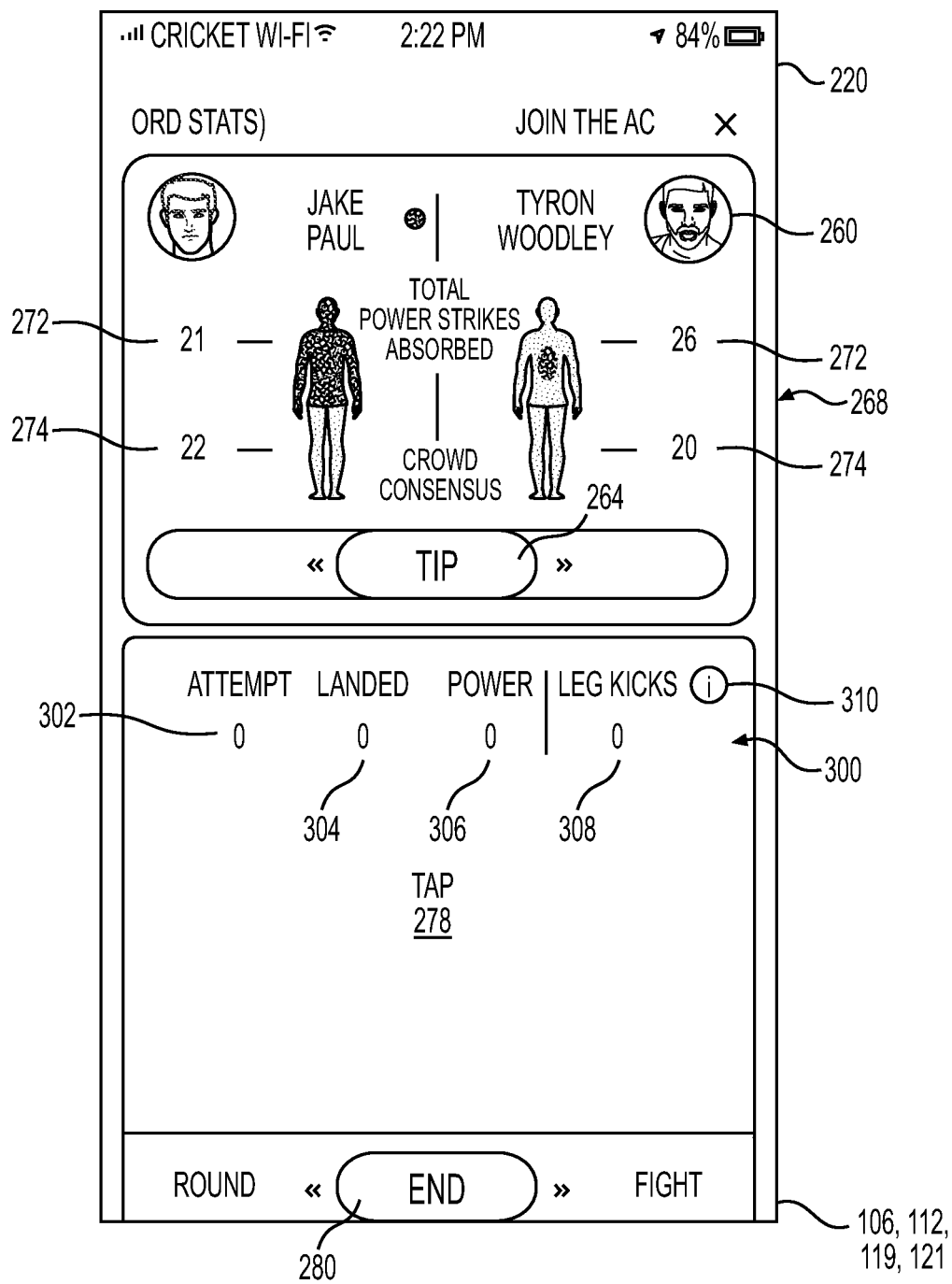
FIG. 18A shows tap entry screen of the mobile application of the mobile device of the system of FIG. 1 according to aspects of the disclosure.
Figure 18B:
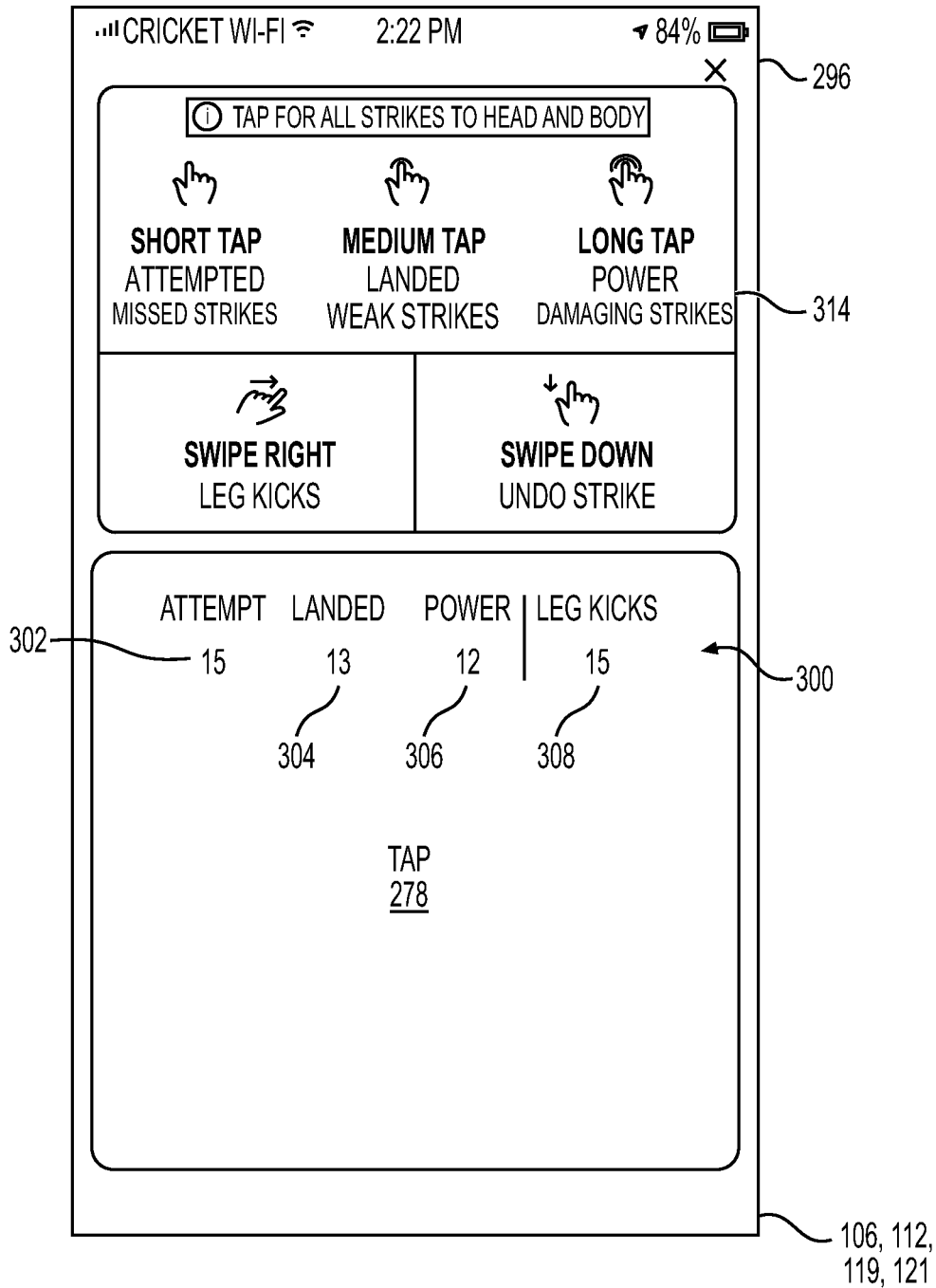
FIG. 18B shows tap information screen of the mobile application of the mobile device of the system of FIG. 1 according to aspects of the disclosure.
Figure 19:
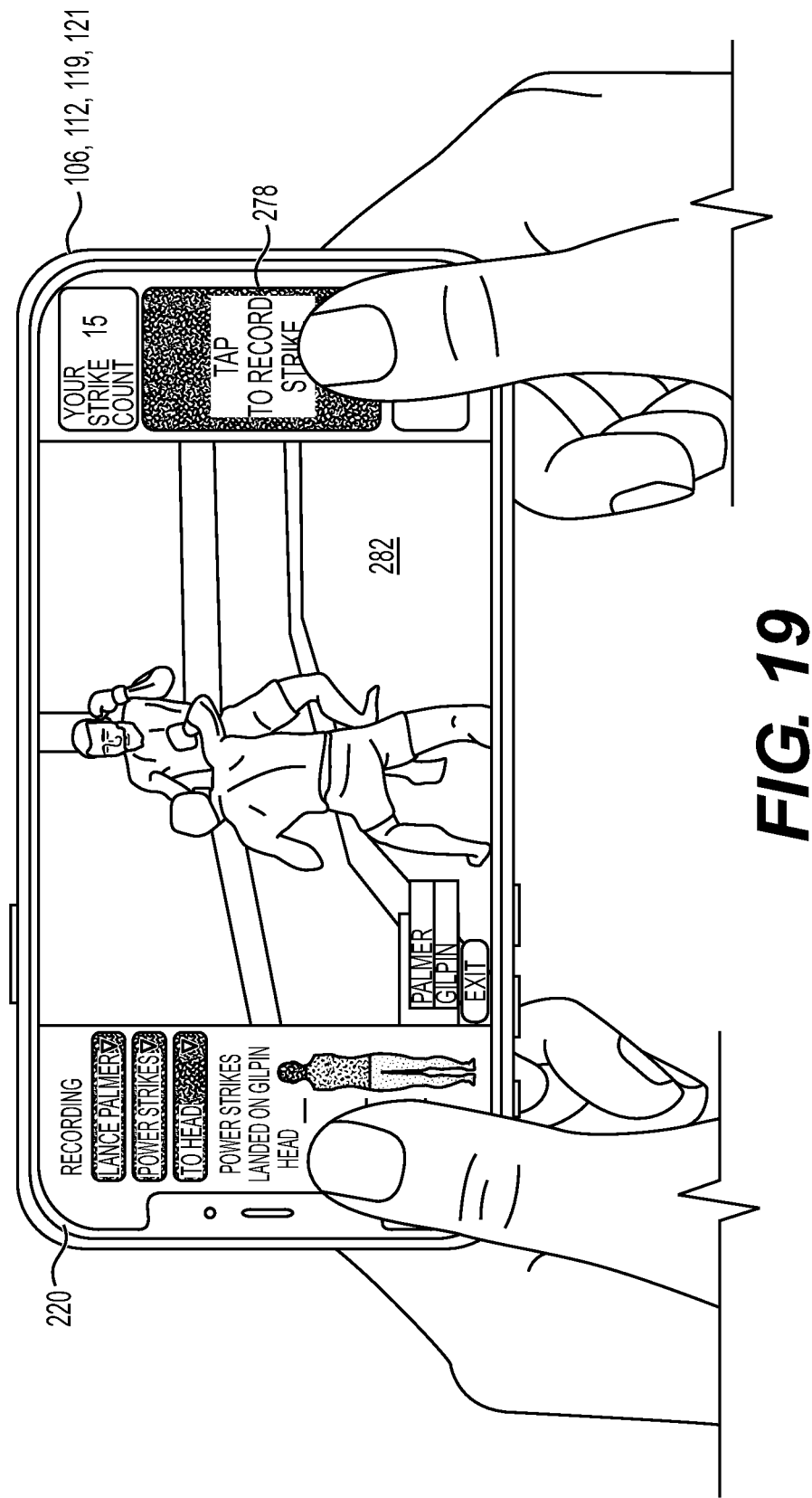
FIG. 19 shows another tap entry screen of the mobile application of the mobile device of the system of FIG. 1 according to aspects of the disclosure.

FIG. 18A shows a tap entry screen 220 of the mobile application 119. The method of the mobile application 119 additionally includes the step of displaying the tap entry screen 220 of the at least one user interface 106 of one of the plurality of spectators in response to the one of the plurality of spectators selecting the record stats button 276. The tap entry screen 220 includes the selected fighter and target fighter indicator 260 illustrating the selected fighter and the target fighter. In addition, the tap entry screen 220 includes the fighter tip selector 264 associated with the fighter tip input for tipping the selected fighter and the target fighter. The tap entry screen 220 also includes the strikes absorbed indicator 268 being the second graphical representation of the performance of the selected fighter. The tap entry screen 220 additionally includes the target fighter on the body-shaped heat graph including the average power body strike counter 272 and the average power leg strike counter 274 for the selected fighter and the target fighter based on the plurality of tap inputs. The tap entry screen 220 includes a main tap button 278 associated with the plurality of tap inputs and selectable by one the one of the plurality of spectators. Additionally, the tap entry screen 220 includes an end round button 280 associated with an end round input for ending entry of the plurality of tap inputs by the one of the plurality of spectators. The method of the mobile application 119 continues with the step of communicating the fighter tip input and the plurality of tap inputs and the end round input to the server controller 108 based on the one of the plurality of spectators respectively selecting the fighter tip selector 264 and the main tap button 278 and the end round button 280. According to an aspect, the tap entry screen 220 may overlay live video 282 of the at least one fight, as shown in FIG. 19, which shows an alternative tap entry screen 220' of the mobile application 119.

According to an aspect, the main tap button 278 on the tap entry screen 220 is selectable by the one of the plurality of spectators for at least one tap duration of time to record each of the plurality of tap inputs. According to a further aspect, the at least one tap duration of time of a selection of the main tap button 278 is indicative of one of the plurality of strike types. The at least one tap duration of time can include a first tap duration and a second tap duration and a third tap duration. The one of the plurality of strike types is selected from the group consisting of attempted strikes, landed strikes, and power strikes. The first tap duration may, for example, be associated with the attempted strikes, the second tap duration associated with the landed strikes, and the third tap duration associated with the power strikes.

Referring back to FIG. 18A, the plurality of strike type may also include leg kicks and the main tap button 278 can also include a tap counter 300. The tap counter 300 includes an attempted strikes count 302, a landed strikes count 304, a power strikes count 306, and a leg kicks count 308 based on the plurality of tap inputs from the one of the plurality of spectators. The main tap button 278 also includes a tap information button 310 used to transition to a tap information screen 312 shown in FIG. 18B. So, the method of the mobile application 119 additionally includes the step of displaying the tap information screen 312 of the at least one user interface 106 of one of the plurality of spectators in response to the one of the plurality of spectators selecting the tap information button 310. The tap information screen 312 shows tap information 314 and/or instructions related to the first tap duration and the second tap duration and the third tap duration. In addition to the main tap button 278 being selectable by the one of the plurality of spectators for the at least one tap duration of time, unintended ones of the plurality of taps can be canceled (i.e., not counted) by the one of the plurality of spectators swiping down. Furthermore, the plurality of tap inputs can also include a swipe right to record the leg kicks. The main tap button 278 remains on the tap information screen 312 with the tap counter 300 having the attempted strikes count 302, landed strikes count 304, power strikes count 306, and leg kicks count 308.

Figure 18C:
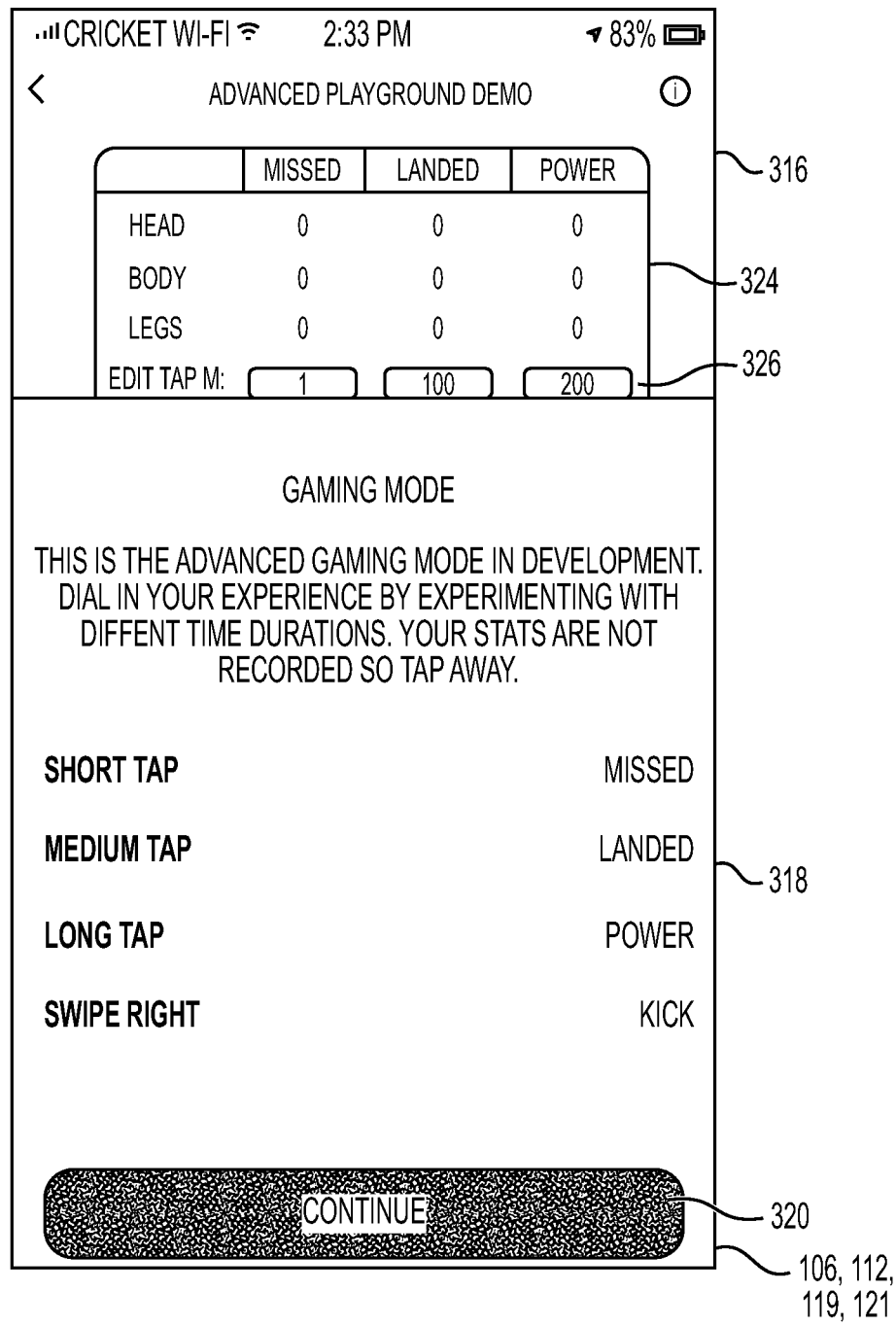
FIG. 18C shows first gaming mode screen of the mobile application of the mobile device of the system of FIG. 1 according to aspects of the disclosure.
Figure 18D:
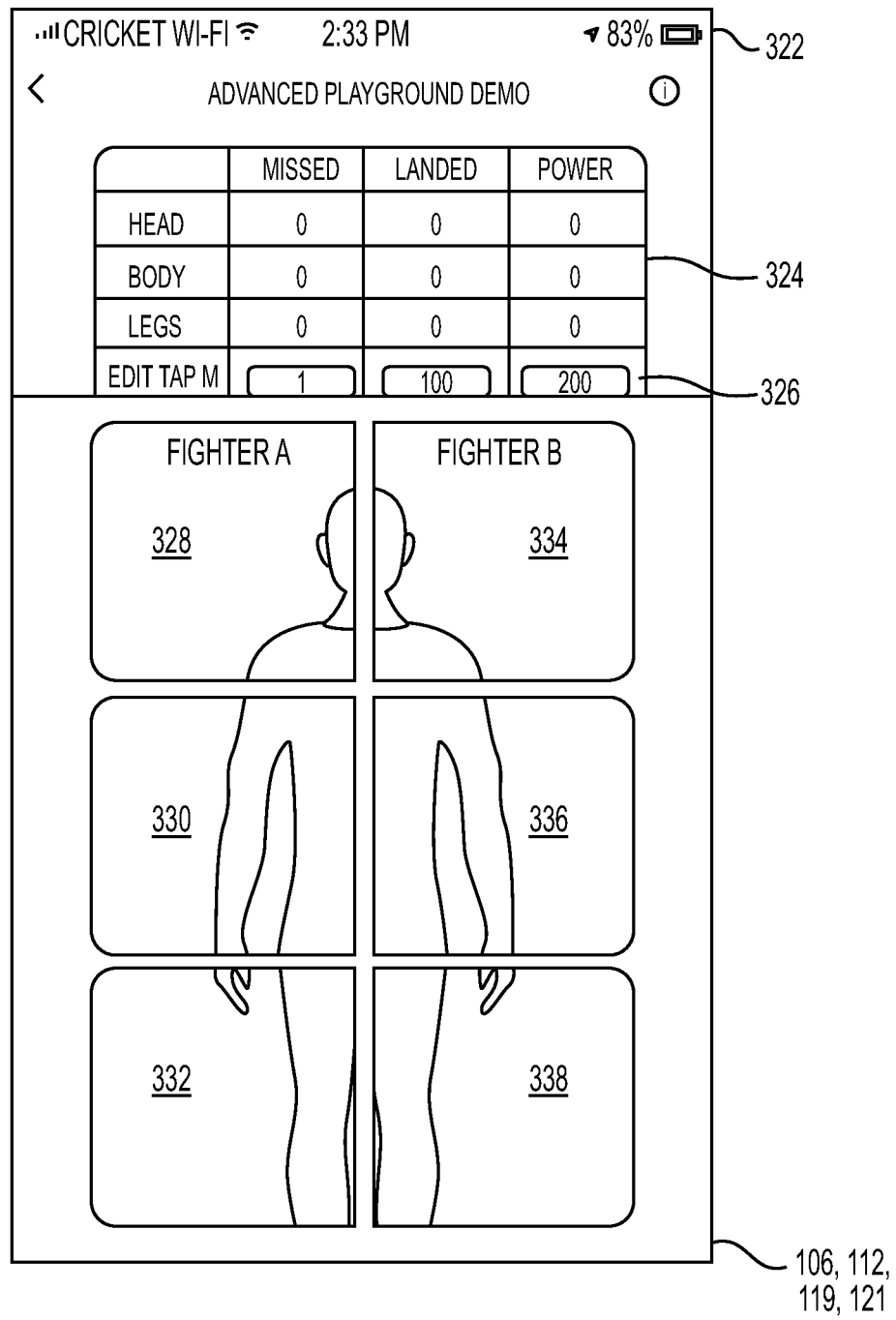
FIG. 18D shows second gaming mode screen of the mobile application of the mobile device of the system of FIG. 1 according to aspects of the disclosure.

FIG. 18C shows a first gaming mode screen 316 of the mobile application 119. The method of the mobile application 119 additionally includes the step of displaying the first gaming mode screen 316 of the at least one user interface 106 of one of the plurality of spectators in response to the one of the plurality of spectators selecting a gaming mode. The first gaming mode screen 316 includes a listing 318 of the plurality of strike types and the plurality of tap inputs associated with each. The first gaming mode screen 316 a gaming continue button 320 for transitioning to a second gaming mode screen 322 shown in FIG. 18D. Thus, the method of the mobile application 119 additionally includes the step of displaying the second gaming mode screen 322 of the at least one user interface 106 of one of the plurality of spectators in response to the one of the plurality of spectators selecting the gaming continue button 320. The second gaming mode screen 322 shows a gaming strike counter 324. The gaming strike counter 324 includes a gaming head strike count, a gaming body strike count, and a gaming leg strike count for each of the plurality of strike types. In addition, the second gaming mode screen 322 includes a gaming duration selector 326 allowing the one of the plurality of spectators to individually adjust the first tap duration and the second tap duration and the third tap duration. The second gaming mode screen 322 additionally includes a plurality of gaming tap buttons 328, 330, 332, 334, 336, 338 selectable by the one of the plurality of spectators for the at least one tap duration of time to record each of the plurality of tap inputs for each of the selected fighter and the target fighter. Similar to the operation of the main tap button 278, the at least one tap duration of time of the selection of the plurality of gaming tap buttons 328, 330, 332, 334, 336, 338 is indicative of one of the plurality of strike types. The plurality of gaming tap buttons 328, 330, 332, 334, 336, 338 includes a gaming selected head tap button 328 associated with the plurality of tap inputs and the body region input to the server controller 108 and selected by the one of the plurality of spectators to record strikes to the head of the selected fighter. The plurality of gaming tap buttons 328, 330, 332, 334, 336, 338 also includes a gaming selected body tap button 330 associated with the plurality of tap inputs and the body region input to the server controller 108 and selected by the one of the plurality of spectators to record strikes to the body of the selected fighter. In addition, the plurality of gaming tap buttons 328, 330, 332, 334, 336, 338 includes a gaming selected legs tap button 332 associated with the plurality of tap inputs and the body region input to the server controller 108 and selected by the one of the plurality of spectators to record strikes to the legs of the selected fighter. The plurality of gaming tap buttons 328, 330, 332, 334, 336, 338 additionally includes a gaming target head tap button 334 associated with the plurality of tap inputs and the body region input to the server controller 108 and selected by the one of the plurality of spectators to record strikes to the head of the target fighter. The plurality of gaming tap buttons 328, 330, 332, 334, 336, 338 includes a gaming target body tap button 336 associated with the plurality of tap inputs and the body region input to the server controller 108 and selected by the one of the plurality of spectators to record strikes to the body of the target fighter. The plurality of gaming tap buttons 328, 330, 332, 334, 336, 338 includes a gaming target legs tap button 338 associated with the plurality of tap inputs and the body region input to the server controller 108 and selected by the one of the plurality of spectators to record strikes to the legs of the target fighter.

Again, the at least one comparison statistic includes the spectator accuracy score 157. Thus, the method of the mobile application 119 also includes the step of receiving the spectator accuracy score 157 for the at least one fight at the mobile device 112 from the server controller 108. The spectator accuracy score 157 for each of the plurality of spectators is a deviation of a spectator average quantity of the plurality of tap inputs from each of the plurality of spectators for the one of the plurality of selected body regions and each of a plurality of strike types selected from the group consisting of attempted strikes, landed strikes, and power strikes and a crowd average quantity of the plurality of tap inputs from all of the plurality of spectators for the one of the plurality of selected body regions and each of the plurality of strike types. The method of the mobile application 119 additionally includes the step of displaying spectator accuracy score 157 to each of the plurality of spectators using the at least one user interface 106 associated with the mobile device 112.

The mobile application 119 also allows each of the plurality of spectators to compare their accuracy to that of the crowd (i.e., others of the plurality of spectators). FIG. 20 shows a records summary screen 284 of the mobile application 119. The method of the mobile application 119 also includes the step of displaying the record summary screen 284 of the at least one user interface 106 of one of the plurality of spectators including the spectator accuracy score 157 as a circular graph. So, each of the plurality of spectators receives their spectator accuracy score 157 after every fight, which is calculated based on their "tapping" versus the crowd. They are also rewarded with digital currency (e.g., the more accurate the recording, the more digital currency is rewarded) and/or "belt" certifications (e.g., received after hitting certain milestones to prove expertise in the community).

In addition, the record summary screen 284 includes a round selector 286 associated with a round input for selecting a round of the at least one fight. The record summary screen 284 also includes a results chart 288 including each of the plurality of strike types 290 with corresponding personalized statistics 292 associated with the plurality of tap inputs by the one of the plurality of spectators for each of the plurality of strike types. The crowd average quantity 294 of the plurality of tap inputs from all of the plurality of spectators for each of the plurality of strike types is also displayed along with an accuracy score 296 (i.e., spectator accuracy score 157) for each of the plurality of strike types. The record summary screen 284 also includes an exit or done button 298 associated with a done input for exiting the record summary screen 284. Next, the method of the mobile application 119 includes the step of communicating the round input and the done input to the server controller 108 based on the one of the plurality of spectators respectively selecting the round selector 286 and the done button 284.

According to another aspect, each of the plurality of spectators can also build their own fighter team and tap team to further compete with the crowd. For instance, friend-teams anywhere in the world can play together with higher rankings being equated to more honor (up to 'Super Ref' certification). In addition tokens may earned can be redeemed for valuable prizes.

Figure 21:
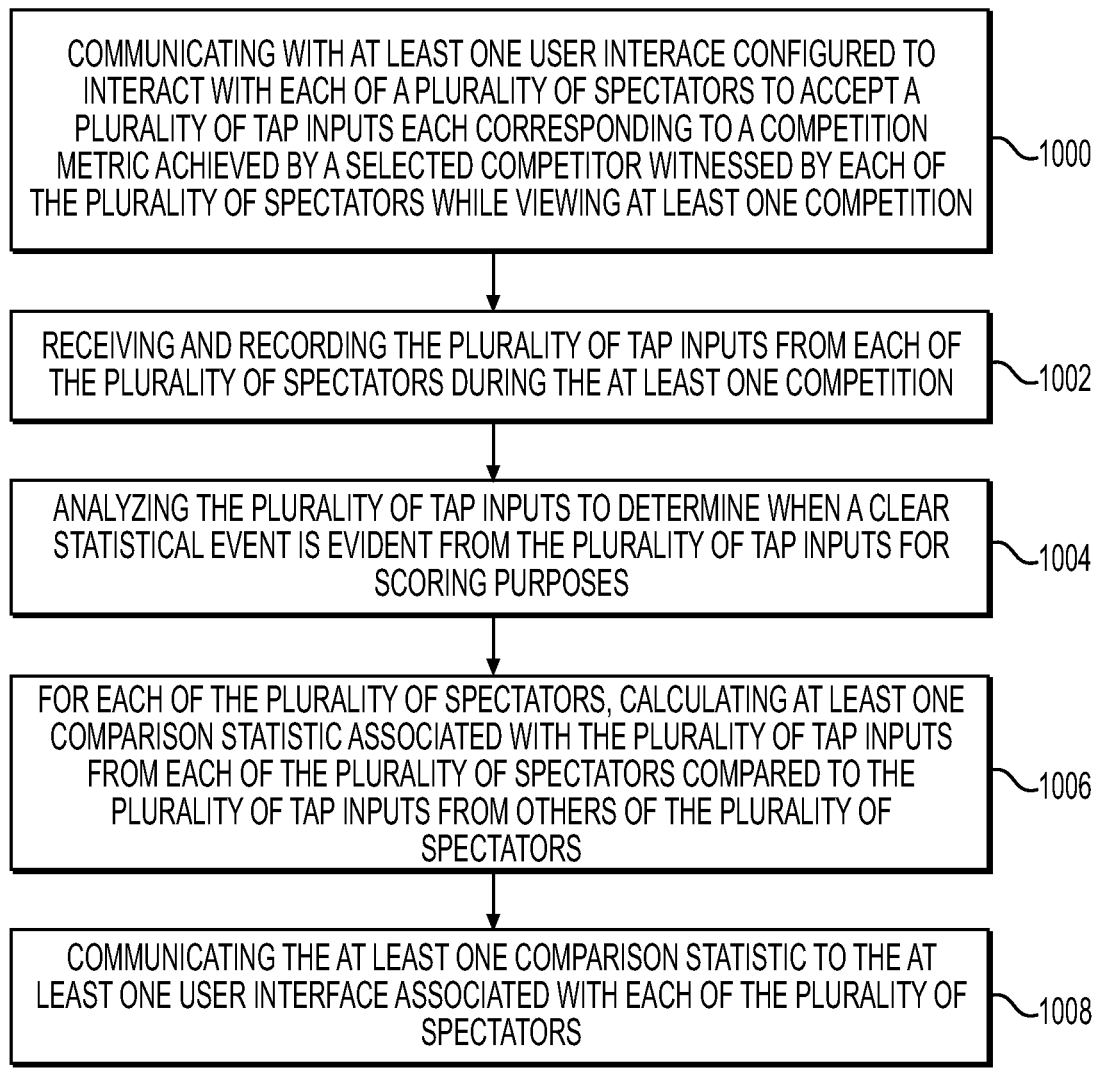
FIG. 21 illustrates steps of a method of sports data collection according to aspects of the disclosure.

As best shown in FIG. 21, a method of sports data collection carried out by the system 100 and mobile application 119 is also provided. The method includes a step of 1000 communicating with at least one user interface 106 configured to interact with each of a plurality of spectators to accept a plurality of tap inputs each corresponding to a competition metric achieved by a selected competitor witnessed by each of the plurality of spectators while viewing at least one competition. The method continues with the step of 1002 receiving and recording the plurality of tap inputs from each of the plurality of spectators during the at least one competition. Next, 1004 analyzing the plurality of tap inputs to determine when a clear statistical event is evident from the plurality of tap inputs for scoring purposes. The method also includes the step of 1006 for each of the plurality of spectators, calculating at least one comparison statistic associated with the plurality of tap inputs from each of the plurality of spectators compared to the plurality of tap inputs from others of the plurality of spectators. The method proceeds by 1008 communicating the at least one comparison statistic to the at least one user interface 106 associated with each of the plurality of spectators.

In more detail, according to an aspect, the method also includes the step of receiving a selected competitor input corresponding to a selected competitor for which each of the plurality of spectators would like to record the competition metric in response to each of the plurality of spectators selecting the selected competitor in the at least one user interface 106. The method continues with the step of receiving a secondary competitor input corresponding to a secondary aspect of the competition metric in response to each of the plurality of spectators selecting the secondary aspect in the at least one user interface 106. The method also includes the step of recording a timestamp for each of the plurality of tap inputs corresponding to a time during the competition when each of the plurality of tap inputs is received.

Again, the at least one competition can be at least one fight and the selected competitor input may be a selected fighter input corresponding to a selected fighter selected by each of the plurality of spectators in the at least one user interface 106 for which each of the plurality of spectators would like to record strikes. The secondary competitor input may be a body region input corresponding to one of a plurality of selected body regions of a target fighter selected from the group consisting of a head and a body and legs of the target fighter by each of the plurality of spectators in the at least one user interface 106 for which each of the plurality of spectators would like to record strikes by the selected fighter. The each of the plurality of tap inputs can correspond to one of the strikes by the selected fighter to the selected body region of the target fighter witnessed by each of the plurality of spectators while viewing the at least one fight. In addition, the at least one comparison statistic may include a spectator accuracy score 157. Accordingly, according to an aspect, the method further includes the step of determining a spectator average quantity of the plurality of tap inputs from each of the plurality of spectators for one of the plurality of selected body regions and one of a plurality of strike types selected from the group consisting of attempted strikes, landed strikes, and power strikes. Next, determining a crowd average quantity of the plurality of tap inputs from all of the plurality of spectators for all strike type combinations of each of the plurality of selected body regions and each of the plurality of strike types. The method continues by calculating the spectator accuracy score 157 for each of the plurality of spectators as a deviation of the spectator average quantity from the crowd average quantity for the one of the plurality of selected body regions and one of the plurality of strike types selected by each of the plurality of spectators. In addition, the method includes the step of communicating the spectator accuracy score 157 for the at least one fight to the at least one user interface 106 for display to each of the plurality of spectators.

The method can also include the step of identifying ones of the plurality of tap inputs as a plurality of bad taps capable of skewing the crowd average quantity of the plurality of tap inputs. The next step of the method is removing the plurality of bad taps from determining the crowd average quantity of the plurality of tap inputs while including the plurality of bad taps in determining the spectator average quantity of the plurality of tap inputs and calculating the spectator accuracy score 157 for ones of the plurality of spectators associated with the plurality of bad taps. In more detail, the method can include the steps of calculating a first quartile and a third quartile of the plurality of tap inputs from all of the plurality of spectators and calculating an interquartile range as the third quartile minus the first quartile. Next, determining an upper bound as 1.5 multiplied by the interquartile range added to the third quartile and a lower bound as the first quartile minus 1.5 multiplied by the interquartile range. The next step of the method is identifying ones of the plurality of tap inputs as ones of the plurality of bad taps being greater than the upper bound or less than the lower bound. The method also includes the step of determining the crowd average quantity of the plurality of tap inputs using a conditional averaging function between the lower bound and the upper bound to exclude the plurality of bad taps from the crowd average quantity.

As discussed above, and according to an aspect, the at least one comparison statistic includes a spectator accuracy score 157. Thus, the method further includes the step of receiving a spectator accuracy score 157 for the at least one fight at the at least one user interface 106. The spectator accuracy score 157 for each of the plurality of spectators is a deviation of a spectator average quantity of the plurality of tap inputs from each of the plurality of spectators for one of the plurality of selected body regions and each of a plurality of strike types selected from the group consisting of attempted strikes, landed strikes, and power strikes and a crowd average quantity of the plurality of tap inputs from all of the plurality of spectators for the one of the plurality of selected body regions and each of the plurality of strike types. The method proceeds by displaying spectator accuracy score 157 to each of the plurality of spectators using the at least one user interface 106.

The method can also include the step of receiving a plurality of fighter statistics inputs and a plurality of fighter characteristics inputs for each of the selected fighter and the target fighter for the at least one fight. The method additionally includes the step of displaying the plurality of fighter statistics inputs and the plurality of fighter characteristics inputs for each of the selected fighter and the target fighter for the at least one fight on the at least one user interface 106 for each of the plurality of spectators.

As discussed above, the at least one user interface 106 includes a main tap button on the tap entry screen 220 and selectable by the one of the plurality of spectators for at least one tap duration of time to record each of the plurality of tap inputs. The at least one tap duration of time of the selection of the main tap button can be indicative of one of a plurality of strike types. Specifically, according to an aspect, the at least one tap duration of time includes a first tap duration and a second tap duration and a third tap duration. The one of the plurality of strike types is selected from the group consisting of attempted strikes, landed strikes, and power strikes. Thus, the first tap duration can be associated with the attempted strikes, the second tap duration associated with the landed strikes, and the third tap duration associated with the power strikes.

Figure 22:
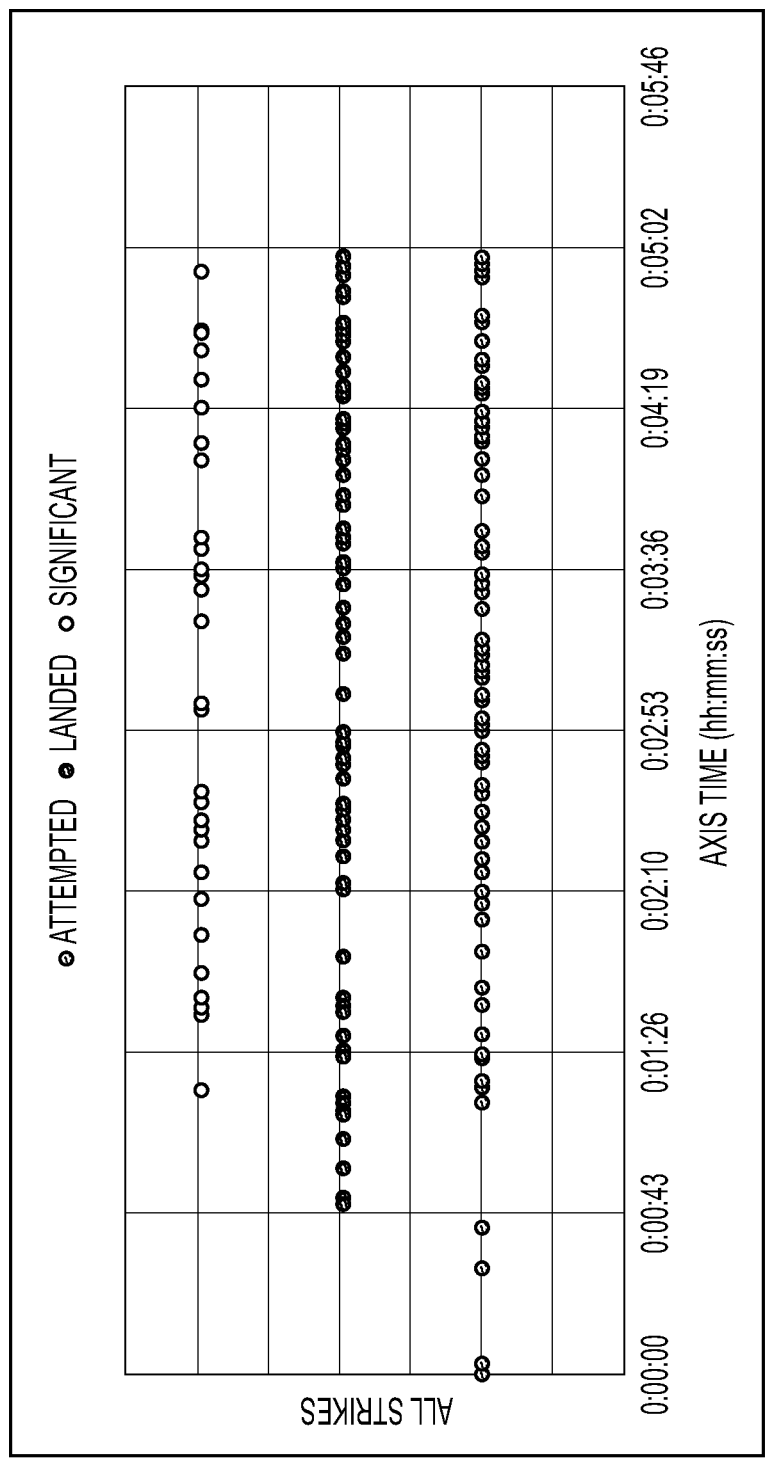
FIGS. 22 and 23 show example data collected based on the plurality of tap inputs according to aspects of the disclosure.
Figure 23:
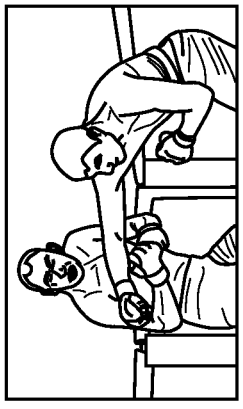

So, the mobile application 119 is a "gameified application" whereby each of the plurality of spectators "tap their phone" while watching fights. This activity across each of the plurality of spectators (in aggregate) collects highly accurate fight stats in real-time. Crowdsourcing data science provides an unlimited base for broad and deep data capability to capture metrics of all types. Data generated includes commercially useful "macro data" around minute-to-minute audience sizes and regional demographics. The mobile application 119 provides the interaction for each of the plurality of spectators watching a fight, and this in turn creates a user-traffic highway. Fundamentally alters the fight as new ways to think about strategy for coaches, and quantify success evolves the game and further reinforces stats. Stats can generate a spread or percentage change of winning (like poker) that can move real-time. As data collection occurs at every process, the server 102 and/or administration panel keeps full records of the plurality of tap inputs which can be individually identified. According to an aspect, the administration panel and/or server 102 can keep records of spectator accuracy scores, fights tapped for, and fighters most often tapped for. FIGS. 22 and 23 show example data collected based on the plurality of tap inputs. Specifically, FIG. 22 shows a plot of strikes versus time. The strikes input as the plurality of tap inputs are processed based on tap intensity or strike type live (e.g., by the server controller 108). The strikes shown include significant strikes at the topmost portion of the plot, landed strikes in the middle of the plot, and attempted strikes in the lower most portion of the plot. Starting from the leftmost side of FIG. 23, a first portion of the processes is shown in which raw data (i.e., the plurality of tap inputs) are collected from the plurality of spectators tapping around the world and analyzed live. Next, the data is scrubbed in real-time to remove any outliers (i.e., bad taps) or "junk" data as described above. Then, in the rightmost portion of FIG. 23, a strike is counted when the data shows a clear statistical event.

Accordingly, the server 102, mobile application 119, and method sports data collection disclosed herein provide numerous advantages. When each of the plurality of spectators tap, an underlying data platform (i.e., the server 102 and/or administration interface 120) is populated. This crowdsourced collection engine drives APIs, media and marketing outputs. The mobile application 119 looks, sounds, vibrates just like a game but is a real-time data collection engine that enables live fan interaction. The mobile application 119 is configured to use low data, so anyone anywhere in the world can participate. The mobile application 119 allows spectators to watch fights with friends, and fully engage with the event.

Figure 24:
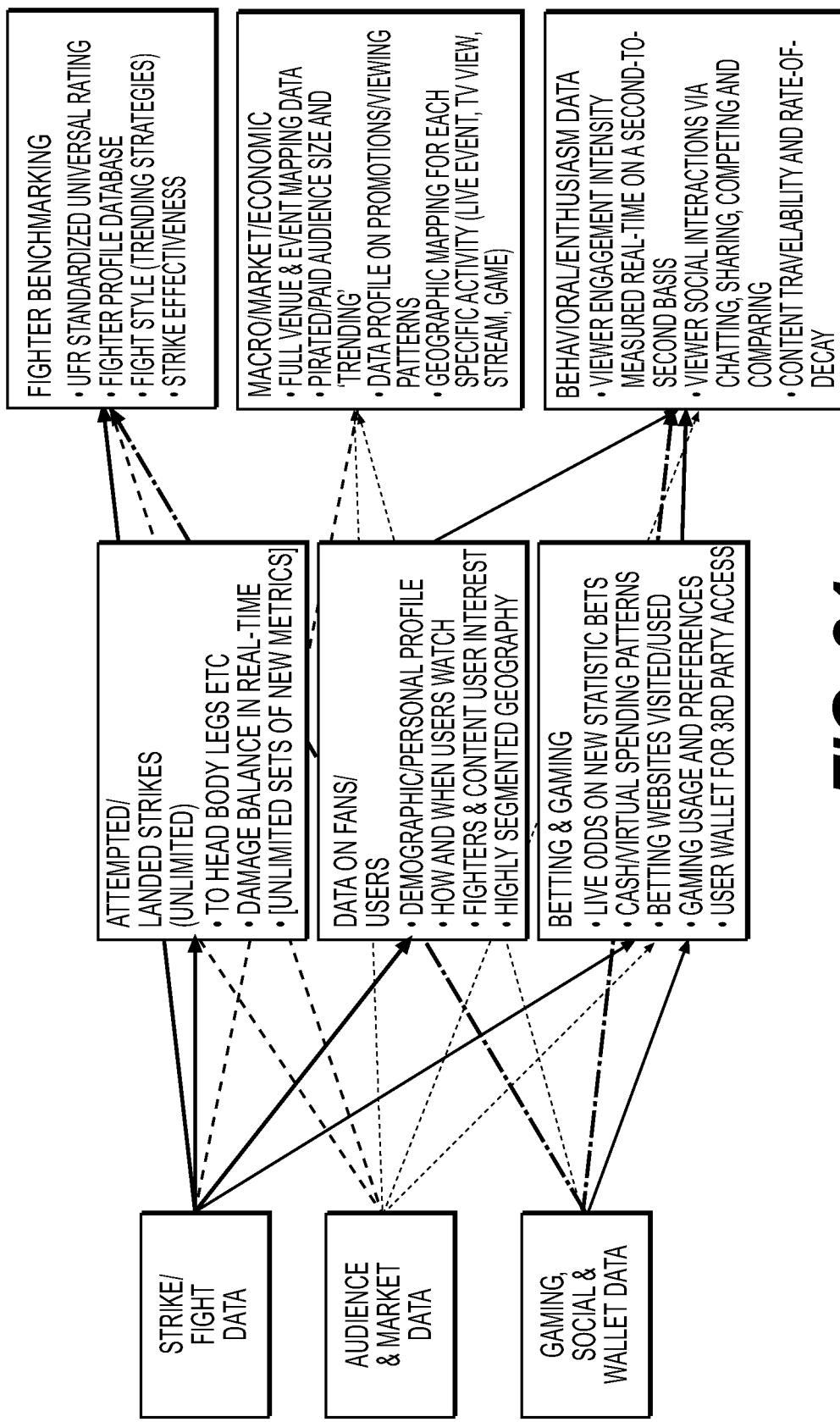
FIG. 24 shows a matrix of generated outputs involving the strike/fight data, audience and market data, and gaming, social and wallet data according to aspects of the disclosure.

The server 102, mobile application 119, and method sports data collection disclosed herein also provides a next generation "research stack". Specifically, historical or existing data can be harvested (e.g., using ICO-X) from sources including filings, company reports, third party databases, etc. Trade pricing can be directly from obtained by exchanges (via an API). Data consortium among institutional and OTC players for ICO-X PRO may also be utilized. The crowd data (i.e., plurality of tap inputs) is continuously 'mined' from the spectator or user community, along with key social insights (trends and flags). Such hard data fills knowledge gaps that otherwise remain dubious. Collective intelligence is real-time and cancels out multiple forms of bias. So, in terms of an informational advantage, reported data and crowd insight is triangulated with ICO-X internal research, analytics, algorithms and 'anti-skewing' mechanisms. What results is real-time research with actionable social insight. FIG. 24 shows a matrix of generated outputs involving the strike/fight data, audience and market data, and gaming, social and wallet data and FIG. 25 shows a diagram illustrating how the reported data and crowd data can result in an informational advantage.

Single viewers or panels such as judges or record keepers typically generate low accuracy or biased data. In contrast, the server 102, mobile application 119, and method sports data collection disclosed herein becomes highly statistical and the data may be continuously tested, normalized and auto-recalculated real-time (e.g., by the server controller 108). Each strike is treated as a separate event, which enables spectators to start-stop tapping at any time, with data being useful, each event is then re-aggregated. Spectators "gaming" the system are limited by a combination of data normalization (discards outliers), active user-profiling, and anti-skewing and fraud techniques discussed above. Consequently, the server 102, mobile application 119, and method sports data collection disclosed herein provide fully scalable infrastructure deployable across combat sports, expanded metric creation possibility (all types of strikes), and independent and transparent data collection and analysis.

So, the distributed data collection disclosed herein employs competitive crowdsourcing tap inputs and collective intelligence to create and surface data that is otherwise too abstract to model. Such analysis is overlapped with prediction science. Specifically, research has proven that the more participants there are providing data, the more accurate the information is (although there are diminishing returns, and the data needs to be scrubbed). The consolidated input of pools of amateurs rivals or outclasses even paid professionals having access to superior information. In addition, statistically relevant pools (an 'n' typically greater than 30 of the plurality of spectators) are necessary for crowd data to offer high reliability (>95% confidence), but the model is of the few capable of accurately handling rapidly changing, real-time data. When dealing with complex issues or perceived observations (cognitive diversity), no one person can have a complete understanding; everyone has a partial understanding, which is clouded by bias. However, when observations are combined, biases cancel each other out, making the collective model more complete than any individual's. The server 102, mobile application 119, and method sports data collection disclosed herein may reward each of the plurality of spectators for contributed data with digital currency paid on a sliding scale (based upon accuracy) to established consensus. This further provides understanding of the distribution of underlying data, surfacing valuable macro trends by region. Payment of the digital currency creates valuable incentive for broad based community participation and network effects, and also the continual decentralization of the models herein to become increasingly more scalable and accurate. Background NB testing may also be implemented to understand various segments and spectator behavior. Spectators nor data are affected by such NB tests, which are based upon state model interpretation (macro level spectator behavior in the mobile application 119).

Clearly, many modifications and variations of the present invention are possible in light of the above teachings and may be practiced otherwise than as specifically described while within the scope of the appended claims. To the extent that it is operationally feasible, embodiments of the disclosure described herein may include any of the features identified above in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. For example, a process, method, article, system, or apparatus that comprises a list of features is not necessarily limited only to those features but may include other features not expressly listed or inherent to such process, method, article, system, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

What is claimed is:

1. A server for sports data collection, comprising:
a server hardware communication unit for communicating with at least one user interface configured to interact with each of a plurality of spectators to accept a plurality of tap inputs each corresponding to a competition metric achieved by a selected competitor witnessed by each of the plurality of spectators while viewing at least one competition; and
a server controller coupled to the server hardware communication unit and configured to:
receive and record the plurality of tap inputs from each of the plurality of spectators during the at least one competition,
analyze the plurality of tap inputs to determine when a clear statistical event is evident from the plurality of tap inputs for scoring purposes,
for each of the plurality of spectators, calculate at least one comparison statistic associated with the plurality of tap inputs from each of the plurality of spectators compared to the plurality of tap inputs from others of the plurality of spectators, and
communicate the at least one comparison statistic to the at least one user interface associated with each of the plurality of spectators for display on the at least one user interface associated with each of the plurality of spectators.

2. The server as set forth in claim 1, wherein the server controller is further configured to:
receive a selected competitor input corresponding to a selected competitor for which each of the plurality of spectators would like to record the competition metric in response to each of the plurality of spectators selecting the selected competitor in the at least one user interface;
receive a secondary competitor input corresponding to a secondary aspect of the competition metric in response to each of the plurality of spectators selecting the secondary aspect in the at least one user interface; and
record a timestamp for each of the plurality of tap inputs corresponding to a time during the competition when each of the plurality of tap inputs is received.

3. The server as set forth in claim 2, wherein the at least one competition is at least one fight and the selected competitor input is a selected fighter input corresponding to a selected fighter selected by each of the plurality of spectators in the at least one user interface for which each of the plurality of spectators would like to record strikes, the secondary competitor input is a body region input corresponding to one of a plurality of selected body regions of a target fighter selected from the group consisting of a head and a body and legs of the target fighter by each of the plurality of spectators in the at least one user interface for which each of the plurality of spectators would like to record strikes by the selected fighter, each of the plurality of tap inputs corresponding to one of the strikes by the selected fighter to the selected body region of the target fighter witnessed by each of the plurality of spectators while viewing the at least one fight.

4. The server as set forth in claim 3, wherein the at least one comparison statistic includes a spectator accuracy score and the server controller is further configured to:
  determine a spectator average quantity of the plurality of tap inputs from each of the plurality of spectators for one of the plurality of selected body regions and one of a plurality of strike types selected from the group consisting of attempted strikes, landed strikes, and power strikes;
  determine a crowd average quantity of the plurality of tap inputs from all of the plurality of spectators for all strike type combinations of each of the plurality of selected body regions and each of the plurality of strike types; and
  calculate the spectator accuracy score for each of the plurality of spectators as a deviation of the spectator average quantity from the crowd average quantity for the one of the plurality of selected body regions and one of the plurality of strike types selected by each of the plurality of spectators; and
  communicate the spectator accuracy score for the at least one fight to the at least one user interface using the server hardware communication unit for display to each of the plurality of spectators.

5. The server as set forth in claim 4, wherein the server controller is further configured to:
  identify ones of the plurality of tap inputs as a plurality of bad taps capable of skewing the crowd average quantity of the plurality of tap inputs; and
  remove the plurality of bad taps from determining the crowd average quantity of the plurality of tap inputs while including the plurality of bad taps in determining the spectator average quantity of the plurality of tap inputs and calculating the spectator accuracy score for ones of the plurality of spectators associated with the plurality of bad taps.

6. The server as set forth in claim 5, wherein the server controller is further configured to:
  calculate a first quartile and a third quartile of the plurality of tap inputs from all of the plurality of spectators;
  calculate an interquartile range as the third quartile minus the first quartile;
  determine an upper bound as 1.5 multiplied by the interquartile range added to the third quartile and a lower bound as the first quartile minus 1.5 multiplied by the interquartile range;
  identify ones of the plurality of tap inputs as ones of the plurality of bad taps being greater than the upper bound or less than the lower bound; and
  determine the crowd average quantity of the plurality of tap inputs using a conditional averaging function between the lower bound and the upper bound to exclude the plurality of bad taps from the crowd average quantity.

7. A mobile application including program instructions tangibly stored on a non-transitory computer-readable medium and operable when executed to cause a mobile device and perform a method of sports data collection via at least one user interface, the method comprising:
  communicating with each of a plurality of spectators to accept a plurality of tap inputs each corresponding to a competition metric achieved by a selected competitor witnessed by each of a plurality of spectators while viewing at least one competition;
  sending the plurality of tap inputs to a server controller in communication with the mobile device associated with the at least one user interface; and
  receiving and displaying tap data related to an analysis of the plurality of tap inputs for scoring purposes by the server controller and at least one comparison statistic associated with each of the plurality of spectators from the server controller, the at least one comparison statistic associated with the plurality of tap inputs from each of the plurality of spectators compared to the plurality of tap inputs from others of the plurality of spectators.

8. The mobile application as set forth in claim 7, further including the steps of:
  accepting a selected competitor input in the at least one user interface corresponding to a selected competitor for which each of the plurality of spectators would like to record the competition metric; and
  accepting a secondary competitor input in the at least one user interface corresponding to a secondary aspect of the competition metric selected by each of the plurality of spectators.

9. The mobile application as set forth in claim 8, wherein the at least one competition is at least one fight and the selected competitor input is a selected fighter input corresponding to a selected fighter selected by each of the plurality of spectators in the at least one user interface for which each of the plurality of spectators would like to record strikes, the secondary competitor input is a body region input corresponding to one of a plurality of selected body regions of a target fighter selected by each of the plurality of spectators in the at least one user interface for which each of the plurality of spectators would like to record strikes by the selected fighter, each of the plurality of tap inputs corresponding to one of the strikes by the selected fighter to the selected body region of the target fighter witnessed by each of the plurality of spectators while viewing at least one fight.

10. The mobile application as set forth in claim 9, wherein the at least one comparison statistic includes a spectator accuracy score, the method further including the steps of:
  receiving a spectator accuracy score for the at least one fight at the mobile device from the server controller, the spectator accuracy score for each of the plurality of spectators being a deviation of a spectator average quantity of the plurality of tap inputs from each of the plurality of spectators for the one of the plurality of selected body regions and each of a plurality of strike types selected from the group consisting of attempted strikes, landed strikes, and power strikes and a crowd average quantity of the plurality of tap inputs from all of the plurality of spectators for the one of the plurality of selected body regions and each of the plurality of strike types; and
  displaying spectator accuracy score to each of the plurality of spectators using the at least one user interface associated with the mobile device.

11. The mobile application as set forth in claim 7, wherein the at least one user interface includes a main tap button on a tap entry screen and selectable by the one of the plurality of spectators for at least one tap duration of time to record each of the plurality of tap inputs, the at least one tap duration of time of a selection of the main tap button being indicative of one of a plurality of strike types.

12. The mobile application as set forth in claim 11, wherein the at least one tap duration of time includes a first tap duration and a second tap duration and a third tap duration and the one of the plurality of strike types is selected from the group consisting of attempted strikes, landed strikes, and power strikes, the first tap duration associated with the attempted strikes, the second tap duration associated with the landed strikes, and the third tap duration associated with the power strikes.

13. A method of collecting sports data comprising the steps of:
- communicating with at least one user interface configured to interact with each of a plurality of spectators to accept a plurality of tap inputs each corresponding to a competition metric achieved by a selected competitor witnessed by each of the plurality of spectators while viewing at least one competition;
- receiving and recording the plurality of tap inputs from each of the plurality of spectators during the at least one competition;
- analyzing the plurality of tap inputs to determine when a clear statistical event is evident from the plurality of tap inputs for scoring purposes;
- for each of the plurality of spectators, calculating at least one comparison statistic associated with the plurality of tap inputs from each of the plurality of spectators compared to the plurality of tap inputs from others of the plurality of spectators; and
- communicating the at least one comparison statistic to the at least one user interface associated with each of the plurality of spectators for display on the at least one user interface associated with each of the plurality of spectators.

14. The method as set forth in claim 13, further including the steps of:
- receiving a selected competitor input corresponding to a selected competitor for which each of the plurality of spectators would like to record the competition metric in response to each of the plurality of spectators selecting the selected competitor in the at least one user interface;
- receiving a secondary competitor input corresponding to a secondary aspect of the competition metric in response to each of the plurality of spectators selecting the secondary aspect in the at least one user interface; and
- recording a timestamp for each of the plurality of tap inputs corresponding to a time during the competition when each of the plurality of tap inputs is received.

15. The method as set forth in claim 14, wherein the at least one competition is at least one fight and the selected competitor input is a selected fighter input corresponding to a selected fighter selected by each of the plurality of spectators in the at least one user interface for which each of the plurality of spectators would like to record strikes, the secondary competitor input is a body region input corresponding to one of a plurality of selected body regions of a target fighter selected from the group consisting of a head and a body and legs of the target fighter by each of the plurality of spectators in the at least one user interface for which each of the plurality of spectators would like to record strikes by the selected fighter, each of the plurality of tap inputs corresponding to one of the strikes by the selected fighter to the selected body region of the target fighter witnessed by each of the plurality of spectators while viewing the at least one fight.

16. The method as set forth in claim 15, wherein the at least one comparison statistic includes a spectator accuracy score and the method further includes the steps of:
- determining a spectator average quantity of the plurality of tap inputs from each of the plurality of spectators for one of the plurality of selected body regions and one of a plurality of strike types selected from the group consisting of attempted strikes, landed strikes, and power strikes;
- determining a crowd average quantity of the plurality of tap inputs from all of the plurality of spectators for all strike type combinations of each of the plurality of selected body regions and each of the plurality of strike types; and
- calculating the spectator accuracy score for each of the plurality of spectators as a deviation of the spectator average quantity from the crowd average quantity for the one of the plurality of selected body regions and one of the plurality of strike types selected by each of the plurality of spectators; and
- communicating the spectator accuracy score for the at least one fight to the at least one user interface for display to each of the plurality of spectators.

17. The method as set forth in claim 16, further including the steps of:
- identifying ones of the plurality of tap inputs as a plurality of bad taps capable of skewing the crowd average quantity of the plurality of tap inputs; and
- removing the plurality of bad taps from determining the crowd average quantity of the plurality of tap inputs while including the plurality of bad taps in determining the spectator average quantity of the plurality of tap inputs and calculating the spectator accuracy score for ones of the plurality of spectators associated with the plurality of bad taps.

18. The method as set forth in claim 17, further including the steps of:
- calculating a first quartile and a third quartile of the plurality of tap inputs from all of the plurality of spectators;
- calculating an interquartile range as the third quartile minus the first quartile;
- determining an upper bound as 1.5 multiplied by the interquartile range added to the third quartile and a lower bound as the first quartile minus 1.5 multiplied by the interquartile range;
- identifying ones of the plurality of tap inputs as ones of the plurality of bad taps being greater than the upper bound or less than the lower bound; and
- determining the crowd average quantity of the plurality of tap inputs using a conditional averaging function between the lower bound and the upper bound to exclude the plurality of bad taps from the crowd average quantity.

19. The method as set forth in claim 13, wherein the at least one user interface includes a main tap button on a tap entry screen and selectable by the one of the plurality of spectators for at least one tap duration of time to record each of the plurality of tap inputs, the at least one tap duration of time of a selection of the main tap button being indicative of one of a plurality of strike types.

20. The method as set forth in claim 19, wherein the at least one tap duration of time includes a first tap duration and a second tap duration and a third tap duration and the one of the plurality of strike types is selected from the group consisting of attempted strikes, landed strikes, and power strikes, the first tap duration associated with the attempted strikes, the second tap duration associated with the landed strikes, and the third tap duration associated with the power strikes.

* * * * *